United States Patent
Wan et al.

(10) Patent No.: US 10,826,674 B2
(45) Date of Patent: Nov. 3, 2020

(54) DATA TRANSMISSION METHOD, DEVICE, AND SYSTEM FOR TRANSMITTING UPLINK DATA IN A WIRELESS COMMUNICATION NETWORK

(71) Applicant: Huawei Technologies Co., Ltd., Shenzhen (CN)

(72) Inventors: Lei Wan, Beijing (CN); Sha Ma, Beijing (CN); Chaojun Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/164,523

(22) Filed: Oct. 18, 2018

(65) Prior Publication Data

US 2019/0052447 A1 Feb. 14, 2019

Related U.S. Application Data

(63) Continuation of application No. PCT/CN2017/080109, filed on Apr. 11, 2017.

(30) Foreign Application Priority Data

Apr. 19, 2016 (CN) .......................... 2016 1 0244505

(51) Int. Cl.
  *H04J 1/00* (2006.01)
  *H04L 5/14* (2006.01)
  (Continued)

(52) U.S. Cl.
  CPC .............. *H04L 5/14* (2013.01); *H04L 5/0048* (2013.01); *H04W 72/04* (2013.01);
  (Continued)

(58) Field of Classification Search
  CPC ....... H04L 5/14; H04L 5/0048; H04L 1/1812; H04W 72/04; H04W 72/12; H04W 72/0446
  See application file for complete search history.

(56) References Cited

U.S. PATENT DOCUMENTS

| | | |
|---|---|---|
| 2012/0093059 A1* | 4/2012 | Bai ................... H04L 5/0007 370/312 |
| 2015/0156762 A1* | 6/2015 | Hwang ............. H04L 1/1671 370/311 |

(Continued)

FOREIGN PATENT DOCUMENTS

| | | |
|---|---|---|
| CN | 101877881 A | 11/2010 |
| CN | 103716841 A | 4/2014 |

(Continued)

OTHER PUBLICATIONS

Mogensen, P., et al., "5G Small Cell Optimized Radio Design", Globecom 2013 Workshop—Emerging Technologies for LTE—Advanced and Beyond-4, Dec. 2013, 6 Pages.

(Continued)

*Primary Examiner* — Abdelnabi O Musa
(74) *Attorney, Agent, or Firm* — Slater Matsil, LLP

(57) ABSTRACT

In a data transmission method, a terminal device obtains configuration information of a subframe n for transmitting at least one of a downlink data channel, an uplink data channel, a downlink control channel, an uplink control channel, a downlink reference signal, and an uplink reference signal. The terminal device performs data transmission between the terminal device and a network device on the subframe n according to the configuration information.

10 Claims, 18 Drawing Sheets

(51) Int. Cl.
*H04L 5/00* (2006.01)
*H04W 72/12* (2009.01)
*H04W 72/04* (2009.01)
*H04L 1/18* (2006.01)

(52) U.S. Cl.
CPC ....... *H04W 72/0446* (2013.01); *H04W 72/12* (2013.01); *H04L 1/1812* (2013.01)

(56) References Cited

U.S. PATENT DOCUMENTS

| | | |
|---|---|---|
| 2015/0256403 A1 | 9/2015 | Li et al. |
| 2015/0271837 A1* | 9/2015 | Larsson ................ H04L 1/1861 370/329 |
| 2016/0044663 A1* | 2/2016 | Yao ....................... H04W 80/00 370/336 |
| 2016/0192355 A1 | 6/2016 | Yu et al. |
| 2017/0048055 A1* | 2/2017 | Fu ....................... H04W 72/042 |

FOREIGN PATENT DOCUMENTS

| | | |
|---|---|---|
| CN | 104348602 A | 2/2015 |
| CN | 105099633 A | 11/2015 |
| EP | 2822202 A1 | 1/2015 |
| KR | 20150026736 A | 3/2015 |
| WO | 2015119846 A1 | 8/2015 |
| WO | 2016037317 A1 | 3/2016 |

OTHER PUBLICATIONS

Huawei, et al., "Discussion on New Frame Structure for Latency Reduction in TDD", 3GPP TSG TAN WG1, Meeting #84, R1-160754, Feb. 2016, 9 Pages, St. Julian's, Malta.
"LTE TDD-FDD Joint Operation—Core Part", TSG RAN Meeting #61, RP-130998, Sep. 2013, 4 Pages, Porto, Portugal.

* cited by examiner

DATA TRANSMISSION METHOD, DEVICE, AND SYSTEM FOR TRANSMITTING UPLINK DATA IN A WIRELESS COMMUNICATION NETWORK

CROSS-REFERENCE TO RELATED APPLICATIONS

This application is a continuation of International Application No. PCT/CN2017/080109, filed on Apr. 11, 2017, which claims priority to Chinese Patent Application No. 201610244505.1, filed on Apr. 19, 2016. The disclosures of the aforementioned applications are hereby incorporated by reference in their entireties.

TECHNICAL FIELD

The present application relates to wireless communications technologies, and in particular, to a data transmission method, a device, and a system.

BACKGROUND

In an LTE system, frame structures corresponding to an FDD duplex mode and a TDD duplex mode are different and are predefined, and therefore cannot be flexibly changed based on a communication requirement. In the prior art, a rigid design of a frame structure of a subframe leads to communication complexity of the LTE system, which reduces communication efficiency. For example, in the existing LTE system, system designs, such as hybrid automatic repeat request (HARQ) timing, channel measurement, or an estimation manner, cannot be consistent in two duplex modes. Before communication, a terminal further needs to determine an LTE communications duplex mode by detecting a synchronization signal, and the like SUMMARY The present application provides a data transmission method, a device, and a system, so as to reduce communication complexity and improve communication efficiency.

In an embodiment of this application, a network device determines that a subframe n is used to transmit at least one of a downlink data channel, an uplink data channel, a downlink control channel, an uplink control channel, a downlink reference signal, and an uplink reference signal. Through manners such as predefining or receiving related configuration information, the terminal device may obtain the foregoing information that is determined by the network device and that is of the subframe n. Based on this, data transmission between the terminal device and the network device on the subframe n may be implemented.

According to one aspect, an embodiment of this application provides a data transmission method. The method includes obtaining, by a terminal device, configuration information. The configuration information indicates that a subframe n is used to transmit at least one of a downlink data channel, an uplink data channel, a downlink control channel, an uplink control channel, a downlink reference signal, and an uplink reference signal. The method further includes performing, by the terminal device, data transmission between the terminal device and a network device on the subframe n based on the configuration information.

According to another aspect, an embodiment of this application provides a data transmission method. The method includes determining, by a network device, that a subframe n is used to transmit at least one of a downlink data channel, an uplink data channel, a downlink control channel, an uplink control channel, a downlink reference signal, and an uplink reference signal. The method further includes performing, by the network device, data transmission between the network device and a terminal device on the subframe n.

According to the foregoing technical solution, the network device determines a channel and/or a signal existing on the subframe n, and the terminal device implements data transmission between the terminal device and the network device on the subframe n by obtaining the channel and/or the signal existing on the subframe n. Because of the channel and/or the signal existing on the subframe n, a same duplex mode may be used on the FDD frequency band and the TDD frequency band, so that designs of the communications system are unified. Compared with the prior art, the terminal device does not need to distinguish between different duplex modes, and does not need to perform communication based on different duplex modes. This simplifies designs of the communications system and improves communication efficiency.

Based on the foregoing aspects, this application further provides the following design solutions:

In a possible design, the terminal device reads the configuration information that is predefined.

In a possible design, the terminal device receives the configuration information that is sent by the network device by using higher layer signaling, physical layer signaling, or scheduling signaling carried on the downlink control channel. In this manner, the channel and/or the signal existing on the subframe n may be configured and notified in real time based on a communication condition, so that communication is more flexible and efficient.

In an implementation, when the terminal device receives the configuration information that is sent by the network device by using the physical layer signaling, the network device may send the physical layer signaling to the terminal device based on a time period T, and the terminal device may receive, based on the time period T, the physical layer signaling sent by the network device. In addition, the network device may send signaling that indicates the time period T to the terminal device. After the time period T is configured, the terminal device does not need to frequently receive the physical layer signaling.

In a possible design, the subframe n is used to transmit at least the uplink reference signal. The performing, by the terminal device, data transmission between the terminal device and a network device on the subframe n includes: sending, by the terminal device, the uplink reference signal to the network device on the subframe n, where the uplink reference signal is used for downlink channel measurement; receiving, by the network device, the uplink reference signal, and performing the downlink channel measurement based on the uplink reference signal; sending, by the network device, downlink scheduling information to the terminal device based on a result of the downlink channel measurement, where the downlink scheduling information is used to instruct the network device to send downlink data to the terminal device on a subframe (n+k); receiving, by the terminal device, the downlink scheduling information; sending, by the network device, the downlink data to the terminal device on the subframe (n+k); and receiving, by the terminal device on the subframe (n+k) based on the downlink scheduling information, the downlink data sent by the network device, where k is a positive integer, and both the subframe n and the subframe (n+k) are located on an FDD uplink frequency band or an FDD downlink frequency band. In an existing FDD system, the uplink reference signal such as a sounding reference signal (SRS) is used for only uplink channel measurement. In addition, the network device can learn a downlink channel state only after receiving downlink channel state information (CSI) sent by the terminal device. In this embodiment of the present application, the FDD uplink frequency band is not limited to being used to transmit an uplink signal or an uplink channel (for example, the downlink data channel exists on the subframe (n+k)), and the FDD downlink frequency band is not limited to being used to transmit a downlink signal or a downlink channel (for example, the uplink reference signal exists on the subframe n). That is, the terminal device may send the uplink reference signal on the FDD downlink frequency band, or the terminal device may send the downlink data on the FDD uplink frequency band. In this way, the network device may use channel reciprocity, and the network device may measure, by using the uplink reference signal sent by the terminal device, the downlink channel on the FDD frequency band to estimate the downlink channel state. This manner facilitates a Multiple Input Multiple Output (MIMO) layout.

In a possible design, the subframe n is used to transmit at least the uplink control channel.

Optionally, the performing, by the terminal device, data transmission between the terminal device and a network device on the subframe n includes: sending, by the terminal device on the subframe n, hybrid automatic repeat request HARQ response information carried on the uplink control channel to the network device, where the HARQ response information is used to indicate a receiving state of downlink data received by the terminal device on a subframe (n−k); and receiving, by the network device, the HARQ response information.

The variable k is a positive integer, and values of k are the same for an FDD uplink frequency band, an FDD downlink frequency band, and a TDD frequency band. That is, HARQ timing of an FDD frequency band and HARQ timing of a TDD frequency band are the same. As a result, designs of the communications system tend to be unified, and complexity of the communications system is reduced.

In an implementation, the subframe n and the subframe (n−k) may be located on frequency bands of a same type. For example, both the subframe n and the subframe (n−k) are located on the TDD frequency band, the FDD uplink frequency band, or the FDD downlink frequency band. It should be noted that even if the subframe n and the subframe (n−k) are located on frequency bands of a same type, the subframe n and the subframe (n−k) may occupy different carriers, that is, the downlink data and the HARQ response information are located on different carriers, and the subframe n and the subframe (n−k) are located on frequency bands of different types. For example, the subframe n is located on the FDD uplink frequency band, and the subframe (n−k) is located on the FDD downlink frequency band. For another example, the subframe n is located on the FDD downlink frequency band, and the subframe (n−k) is located on the FDD uplink frequency band. For another example, the subframe n is located on the TDD frequency band, and the subframe (n−k) is located on the FDD uplink frequency band, or the subframe (n−k) is located on the FDD downlink frequency band. For another example, the subframe n is located on the FDD uplink frequency band, or the subframe n is located on the FDD downlink frequency band, and the subframe (n−k) is located on the TDD frequency band.

In another implementation, when k=1, a HARQ feedback speed is highest. This may reduce a communication latency.

In another implementation, k is equal to 1, and the subframe (n−k) is a subframe (n−1); the downlink data channel is a first downlink data channel, the uplink data channel is a first uplink data channel, the downlink control channel is a first uplink data channel, the uplink control channel is a first uplink control channel, the downlink reference signal is a first downlink reference signal, and the uplink reference signal is a first uplink reference signal; the subframe n is used, from front to back in time domain, to sequentially transmit the first uplink reference channel, the first uplink control channel, and the first uplink data channel; and the subframe (n−1) is used, from front to back in time domain, to sequentially transmit a second downlink reference channel, a second downlink control channel, and a second downlink data channel; where the subframe (n−1) is located on a first carrier, the subframe n is located on a second carrier, and timing on the second carrier lags behind timing on the first carrier. In this way, the terminal device may have enough processing time to decode the downlink data and generate the HARQ response information. The first carrier and the second carrier may be located on a same frequency band, or may be located on different frequency bands.

Optionally, the performing, by the terminal device, data transmission between the terminal device and a network device on the subframe n includes: sending, by the terminal device on the subframe n, CSI carried on the uplink control channel or the uplink data channel to the network device. Reporting period parameters of the CSI for the FDD uplink frequency band, the FDD downlink frequency band, and the TDD frequency band are the same. In this embodiment of the present application, any subframe on the FDD frequency band and the TDD frequency band may be configured based on a requirement, and is used to transmit at least the uplink control channel. Therefore, it can be implemented that reporting period parameters of the CSI for the FDD uplink frequency band, the FDD downlink frequency band, and the TDD frequency band are the same.

In an implementation, when each subframe is used to transmit at least the uplink control channel, a reporting period of the CSI may be a length of one subframe. In this way, the network device may learn latest channel state information by using CSI sent by the terminal device, so as to configure accurate downlink scheduling information.

In a possible design, the subframe n is used to transmit at least the uplink data channel. The performing, by the terminal device, data transmission between the terminal device and a network device on the subframe n includes: sending, by the terminal device on the subframe n, uplink data carried on the uplink data channel to the network device, where the uplink data is sent based on the uplink scheduling information that is received by the terminal device on the subframe (n−k) and that is sent by the network device; and receiving, by the network device on the subframe n, the uplink data that is sent by the terminal device and that is carried on the uplink data channel, where k is an integer ≥0, and values of k are the same for an FDD uplink frequency band, an FDD downlink frequency band, and a TDD frequency band. The subframe n and the subframe (n−k) may be located on frequency bands of a same type. According to the technical solution provided in this embodiment of the present application, uplink data scheduling latency of the FDD frequency band is the same as uplink data scheduling latency of the TDD frequency band. As a result, designs of the communications system tend to be unified, and complexity of the communications system is reduced. In an implementation, when k=0, lowest uplink data scheduling latency may be implemented. In this case, a particular design may further be made for a structure of the subframe n on different carriers. A corresponding technical solution may be: obtaining, by the terminal device, first configuration information, where the first configuration information indicates that the subframe n on the first carrier is used to transmit the first uplink data channel, the uplink reference signal, the uplink control channel, and the second uplink data channel, and the subframe n on the first carrier is used, from front to back in time domain, to sequentially transmit the first uplink data channel, the uplink reference signal, the uplink control channel, and the second uplink data channel; obtaining, by the terminal device, second configuration information, where the second configuration information indicates that a subframe (n+1) on the second carrier is used to transmit at least a third uplink data channel, and the subframe (n+1) on the second carrier first transmits the third uplink data channel in time domain; sending, by the terminal device on the subframe n, uplink data carried on the second uplink data channel to the network device; and sending, by the terminal device on the subframe (n+1), uplink data carried on the third uplink data channel to the network device, where the uplink data of the second uplink data channel and the uplink data of the third uplink data channel are sent based on the uplink scheduling information sent by the network device, the subframe n of the first carrier and the subframe (n+1) of the second carrier are located on a same frequency band, and the uplink scheduling information is located on the third carrier and is located on a frequency band different from a frequency band on which the subframe n and the subframe (n+1) are located. In an implementation, the first carrier and the second carrier are a same carrier. In this way, one piece of uplink scheduling information may be used to schedule data channels in different subframes, so that communication efficiency is improved.

In a possible design, the subframe n is used to transmit at least the downlink data channel. The performing, by the terminal device, data transmission between the terminal device and a network device on the subframe n specifically includes: receiving, by the terminal device on the subframe n, the downlink data that is sent by the network device and that is carried on the downlink data channel. In an implementation, the subframe is further used to transmit the downlink control channel, and the performing, by the terminal device, data transmission between the terminal device and a network device on the subframe n further includes: receiving, by the terminal device on the downlink control channel of the subframe n, the downlink scheduling information sent by the network device, where the downlink scheduling information is used to schedule the downlink data in the downlink data channel on the subframe n; and in this case, receiving, by the terminal device on the downlink data channel of the subframe n based on the downlink scheduling information, the downlink data sent by the network device. In this implementation, fastest scheduling of the downlink data is implemented.

In a possible design, determining, by the network device, channels and/or signals that are transmitted by the subframe n, and obtaining, by the terminal device, the channels and/or the signals of the subframe n may be: the subframe n is used, from front to back in time domain, to sequentially transmit the downlink reference signal, the downlink control channel, the uplink reference signal, the uplink control channel, and the uplink data channel, where a guard interval GP is configured between the downlink control channel and the uplink reference signal; or the subframe n is used, from front to back in time domain, to sequentially transmit the downlink reference signal, the downlink control channel, the uplink reference signal, the uplink control channel, and the downlink data channel, where the GP is configured between the downlink control channel and the uplink reference signal; or the subframe n is used, from front to back in time domain, to sequentially transmit the downlink reference signal, the downlink control channel, the uplink reference signal, and the uplink data channel, where the GP is configured between the downlink control channel and the uplink reference signal; or the subframe n is used, from front to back in time domain, to sequentially transmit the downlink reference signal, the downlink control channel, the uplink reference signal, and the downlink data channel, where the GP is configured between the downlink control channel and the uplink reference signal; or the configuration information indicates that the subframe n is used, from front to back in time domain, to sequentially transmit the downlink reference signal, the downlink control channel, the downlink data channel, and the uplink reference signal, where the GP is configured between the downlink data channel and the uplink reference signal. It should be noted that the network device may further determine all the foregoing channels and/or a time-domain sequence of all the channels on the subframe n; and the terminal side may further obtain all the channels existing on the subframe n and/or a time-domain sequence of all the channels by using all the channels and/or a time-domain sequence of all the channels that are/is learned in advance or by using the configuration information.

In a possible design, time domain resource locations of a synchronization signal sent by the network device are the same for the FDD uplink frequency band, the FDD downlink frequency band, and the TTD frequency band.

In a possible design, in a communications system to which the technical solution provided in this embodiment of the present application is applied, a frequency division duplex (FDD) uplink frequency band, an FDD downlink frequency band, and a time division duplex (TDD) frequency band use a duplex mode of transparent duplex, and the transparent duplex is a duplex mode in which FDD and TDD do not need to be distinguished.

In a possible design, the network device determines that the subframe n is used to transmit at least the downlink reference signal, and the downlink reference signal may be located in first M symbols of the subframe n, where M is a positive integer, for example, a value of M is 1. In this way, the terminal device can perform channel estimation based on the received downlink reference channel as soon as possible. If the network device determines that the subframe n is further used to transmit the downlink control channel, in an implementation, the downlink control channel may be located in N symbols behind the downlink reference channel in time domain, where N is a positive integer. In another implementation, the downlink reference signal and the downlink control channel are located on at least one identical symbol in time domain. In this case, the downlink reference signal is located on discontinuous subcarriers in frequency domain.

In a possible design, when the network device determines that the subframe n is used to transmit at least the uplink reference signal, the uplink reference signal may be located in the $k^{th}$ symbol (k is a positive integer) of the subframe n or first P symbols of the subframe n, where P is a positive integer, for example, a value of P is 1. In this way, the network device can perform channel estimation based on the received uplink reference channel as soon as possible. When the uplink reference signal is located on at least two symbols, the at least two symbols may be continuous or discontinuous. The uplink reference signal may be located on discontinuous subcarriers in frequency domain. If the network device determines that the subframe n is further used to transmit the uplink control channel, in an implementation, the uplink control channel is located in O symbols behind the uplink reference channel in time domain, where O is a positive integer.

In a possible design, the subframe n in this embodiment of the present application may be located on an FDD uplink frequency band, an FDD downlink frequency band, or a TDD frequency band.

According to another aspect, an embodiment of the present application provides a network device, where the network device has a function of implementing behaviors of the network device in the foregoing method design. The function may be implemented by hardware, or may be implemented by hardware by executing corresponding software. The hardware or the software includes one or more units corresponding to the foregoing function.

In a possible design, a structure of the network device includes a processor and a transmitter, where the processor is configured to support the network device in performing corresponding functions in the foregoing method. The transmitter is configured to support communication between the network device and the terminal device, and send information or an instruction involved in the foregoing method to the terminal device. The network device may further include a memory, where the memory is configured to couple to the processor and stores necessary program instructions and data that are of the network device.

According to another aspect, an embodiment of the present application provides a terminal device, where the terminal device has a function of implementing behaviors of the terminal device in the foregoing method design. The function may be implemented by hardware, or may be implemented by hardware by executing corresponding software. The hardware or the software includes one or more units corresponding to the foregoing function. The units may be software and/or hardware.

In a possible design, a structure of the terminal device includes a receiver and a processor, where the processor is configured to support the terminal device in performing corresponding functions in the foregoing method. The transmitter is configured to support communication between the terminal device and the network device, and receive information or an instruction that is sent by the network device and that is involved in the foregoing method. The terminal device may further include a memory, where the memory is configured to couple to the processor and stores necessary program instructions and data that are of the network device.

According to another aspect, an embodiment of the present application provides a communications system, and the system includes the network device and the terminal device described in the foregoing aspects.

According to another aspect, an embodiment of the present application provides a computer storage medium, configured to store a computer software instruction used for the foregoing network device, and the computer storage medium includes a program designed for performing the foregoing aspects.

According to another aspect, an embodiment of the present application provides a computer storage medium, configured to store a computer software instruction used for the foregoing terminal device, and the computer storage medium includes a program designed for performing the foregoing aspects.

According to another aspect, an embodiment of the present application provides a chip system, including: at least one processor, a memory, an input/output component, and a bus, where the at least one processor obtains an instruction from the memory by using the bus, so as to implement designed functions of the network device in the foregoing method.

According to another aspect, an embodiment of the present application provides a chip system, including: at least one processor, a memory, an input/output component, and a bus, where the at least one processor obtains an instruction from the memory by using the bus, so as to implement designed functions of the terminal device in the foregoing method.

According to the technical solutions provided in the embodiments of the present application, the network device determines a channel and/or a signal existing on the subframe n, and the terminal device implements data transmission between the terminal device and the network device on the subframe n by obtaining the channel and/or the signal existing on the subframe n. Because of the channel and/or the signal existing on the subframe n, a same duplex mode may be used on the FDD frequency band and the TDD frequency band, so that designs of the communications system are unified. Compared with the prior art, the terminal device does not need to distinguish between different duplex modes, and does not need to perform communication based on different duplex modes. This simplifies designs of the communications system and improves communication efficiency.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DETAILED DESCRIPTION OF ILLUSTRATIVE EMBODIMENTS

Figure 1:
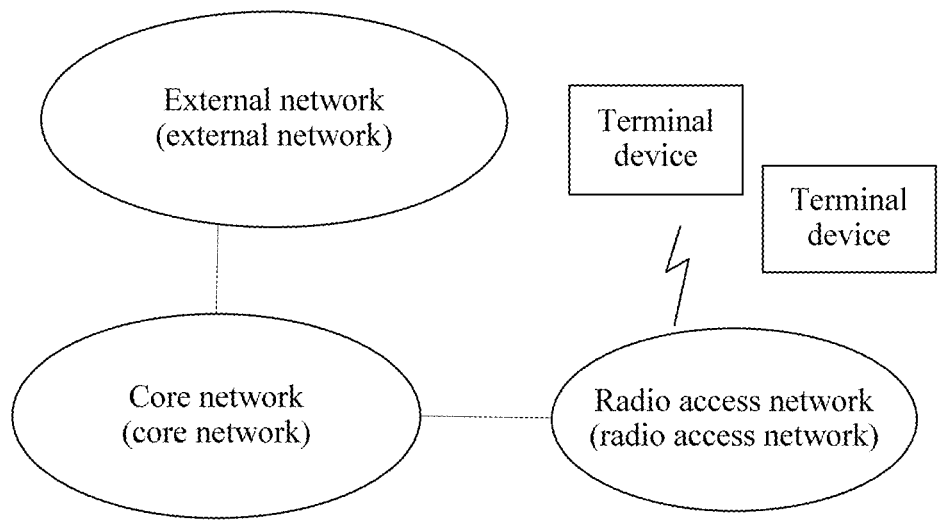
FIG. 1 shows an application scenario according to an embodiment of the present application.

FIG. 1 shows an application scenario according to an embodiment of the present application. As shown in FIG. 1, a terminal device accesses an external network by using a radio access network (RAN) and a core network (CN). A technology described in the present application is applicable to an LTE system, or other wireless communications systems that use various radio access technologies, for example, systems that use access technologies such as Code Division Multiple Access, Frequency Division Multiple Access, Time Division Multiple Access, orthogonal frequency division multiple access, and single carrier frequency division multiple access, and a subsequent evolved system, for example, a 5th Generation (5G) system.

The following describes frequently-used terms in this application.

In this application, nouns "network" and "system" are usually interchangeably used, but meanings of the nouns may be understood by a person of ordinary skill in the art; and the noun "data transmission" includes the following three cases: data sending, data receiving, or data sending and data receiving. That is, the data transmission herein includes uplink data transmission and/or downlink data transmission. Data may include a channel and/or a signal. Uplink data transmission is uplink channel transmission and/or uplink signal transmission, and downlink data transmission is downlink channel transmission and/or downlink signal transmission.

A terminal device in this application may be a device that provides voice connectivity and/or data connectivity for a user, a handheld device, a vehicular device, a wearable device, a computing device that has a radio communication function, or another processing device connected to a wireless modem, and user equipment (UE) and mobile stations (MS) in various forms, and the like. For ease of description, in this application, devices mentioned above are collectively referred to as terminal devices. A network device in this application may be an apparatus that is deployed in a RAN and that is configured to provide a radio communication function for the terminal device. The network device may include a macro base station, a micro base station, a regeneration station, and an access point that are in various forms, and the like. In systems that use different radio access technologies, specific names of the network device may be different. For example, in an LTE system, the network device is referred to as an evolved NodeB (eNB). Types of the terminal device and the network device are not limited in this application.

An existing LTE system has an FDD frequency band and a TDD frequency band. The FDD frequency band is divided into an FDD uplink frequency band and an FDD downlink frequency band. The FDD frequency band uses an FDD frame structure that is corresponding to an FDD duplex mode, and the TDD frequency band uses a TDD frame structure that is corresponding to a TDD duplex mode.

Figure 2A:
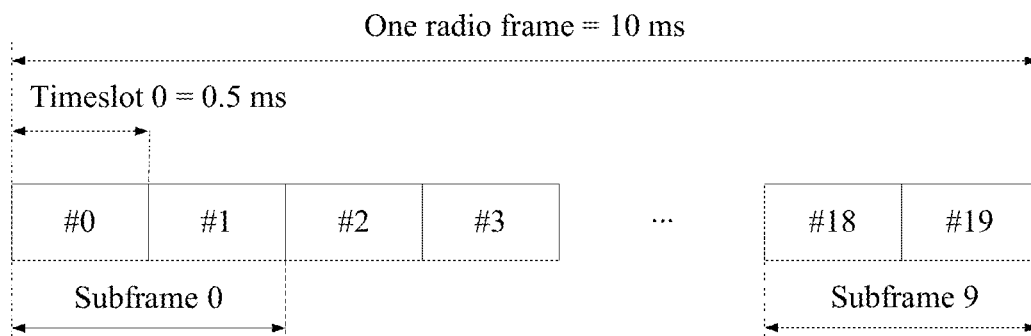
FIG. 2(a) is a structural diagram of an FDD frame according to an embodiment of the present application.
Figure 2B:
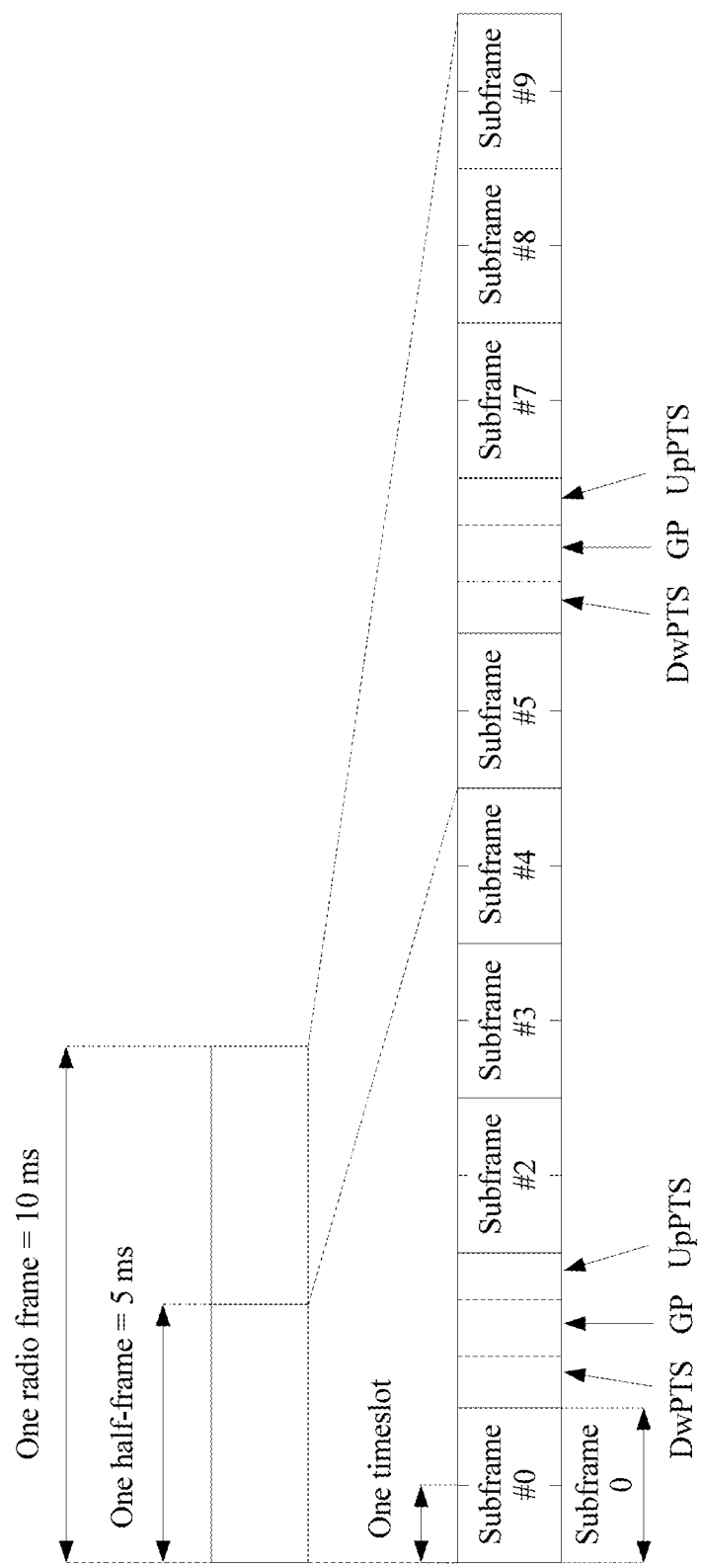
FIG. 2(b) is a structural diagram of a TDD frame that is configured as 5 ms uplink-downlink switching according to an embodiment of the present application.

FIG. 2 shows a frame structure of an existing LTE communications system. FIG. 2(a) shows an FDD frame structure. As shown in FIG. 2, a 10 ms radio frame is divided into 10 subframes with a length of 1 ms, and each subframe includes two timeslots (slot) with a length of 0.5 ms. For FDD, uplink transmission and downlink transmission are performed on different frequency bands. On the FDD uplink frequency band, all subframes are uplink subframes; and on the FDD downlink frequency band, all subframes are downlink subframes. An existing TDD supports seven uplink-downlink configurations. As shown in FIG. 1, U represents an uplink subframe, D represents a downlink subframe, and S represents a special subframe. The special subframe includes a downlink pilot timeslot (DwPTS), a guard period (GP), and an uplink pilot timeslot (UpPTS). FIG. 2(b) is an example structure in which a TDD frame is configured as 5 ms uplink-downlink switching. As shown in FIG. 2(b), the 10 ms radio frame is divided into two half-frames with a length of 5 ms, and each half-frame includes five subframes with a length of 1 ms, which includes a special subframe and four normal subframes. The normal subframe includes two timeslots with a length of 0.5 ms, and the special subframe includes three special timeslots (UpPTS, GP, and DwPTS). For TDD, uplink transmission and downlink transmission are performed on a same frequency band, which includes an uplink subframe, a downlink subframe, and a special subframe. (The uplink subframe and the downlink subframe are the normal subframes described above).

TABLE 1

| Uplink-downlink configuration | Downlink-to-uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In a future evolved LTE system, a length of a subframe may be shortened to reduce latency, for example, a length of each subframe is shortened to 0.2 ms, 0.25 ms, or fewer length.

In the present application, n in the subframe n is a subframe number. A subframe n-a is the $a^{th}$ subframe before the subframe n, that is, the subframe n-a is the $a^{th}$ subframe counted forward from the subframe n. A subframe n+a is the $a^{th}$ subframe behind the subframe n, that is, the subframe n+a is the $a^{th}$ subframe counted backward from the subframe n. For example, based on a frame structure in the existing LTE system, if n=4 and a=2, the subframe n-a is a subframe 2 in a radio frame in which the subframe n is located; if n=0 and a=2, the subframe n−a is a subframe 8 in a previous radio frame of the radio frame in which the subframe n is located; if n=4 and a=3, the subframe n+a is a subframe 7 of the radio frame in which the subframe n is located; and if n=8 and a=2, the subframe n+a is a subframe 0 in a next radio frame of the radio frame in which the subframe n is located.

In the present application, a time length of a subframe and a time length of a symbol are not limited. Without loss of generality, one subframe includes N symbols (N is a positive integer), that is, one uplink subframe includes N uplink symbols, or one downlink subframe includes N downlink symbols. The uplink symbol and the downlink symbol are referred to as a symbol. The uplink symbol is referred to as a single carrier-frequency division multiple access (SC-FDMA) symbol, and the downlink symbol is referred to as an orthogonal frequency division multiplexing (OFDM) symbol. It should be noted that if a new uplink multi-access mode or downlink multi-access mode are introduced in a subsequent technology, the uplink symbol or the downlink symbol can be still referred to as symbols. The uplink multi-access mode and the downlink multi-access mode are not limited in the present application.

Different communications solutions are designed in the LTE system to support the foregoing two duplex modes. This inevitably increases communication complexity and reduces communication efficiency. Therefore, a solution is urgently needed to unify the system design and reduce communication complexity.

Figure 3:
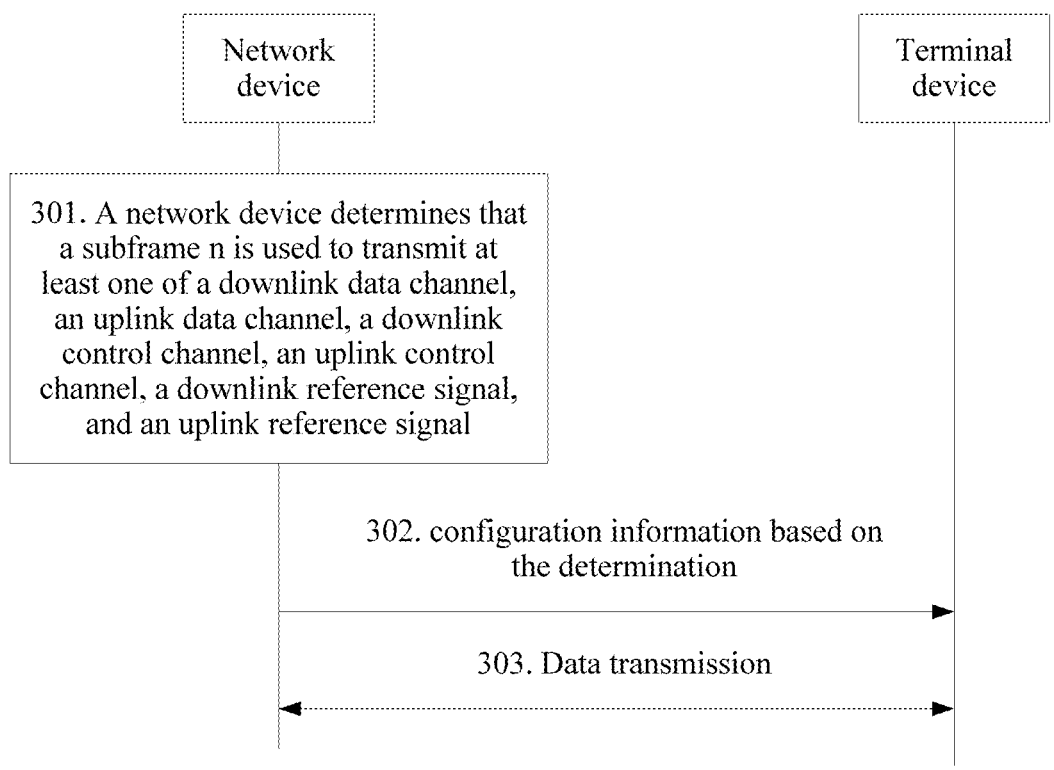
FIG. 3 is a flowchart of a data transmission method according to an embodiment of the present application.

FIG. 3 is a flowchart of a data transmission method according to an embodiment of the present application. The method may be applied to the application scenario shown in FIG. 1, and the method includes the following steps.

301. A network device determines that a subframe n is used to transmit at least one of a downlink data channel, an uplink data channel, a downlink control channel, an uplink control channel, a downlink reference signal, and an uplink reference signal.

That is, 301. A network device determines that at least one of a downlink data channel, an uplink data channel, a downlink control channel, an uplink control channel, a downlink reference signal, and an uplink reference signal is located in the subframe n.

To reduce communication complexity, an existing frame structure needs to be redesigned, so that a communications system can use a consistent communications solution or duplex mode for an FDD frequency band and a TDD frequency band. A channel and/or signal carried on the subframe n may be determined by the network device.

In an implementation, the channel and/or signal that is carried on the subframe n and that is determined by the network device may be determined in real time based on a requirement, or may be determined in advance to be stored in a memory beside the network device.

The channel includes a downlink data channel, an uplink data channel, a downlink control channel, and an uplink control channel. The downlink data channel is used to carry downlink shared channel (DL-SCH) data and/or paging channel (PCH) data. This is, the downlink data channel is used to carry downlink service data or higher layer signaling. The uplink data channel is used to carry uplink shared channel (UL-SCH) data. The downlink control channel is used to carry downlink physical layer signaling such as downlink control information (DCI) and a hybrid automatic repeat request (HARQ) response. The uplink control channel is used to carry uplink control information (UCI) such as a channel quality indicator (CQI), a precoding matrix indicator (PMI), a hybrid automatic repeat request (HARQ) response, and a rank indication (RI).

The signal includes a downlink reference signal and an uplink reference signal. The downlink reference signal is mainly used for downlink channel measurement or channel estimation, for example, the downlink reference signal may be a cell-specific reference signal (CRS), a UE-specific reference signal (URS), a group-specific reference signal (GRS), a positioning reference signal (PRS), a multicast-broadcast single-frequency network (MBSFN) reference signal (MBSFN reference signal), a channel state information reference signal (CSI reference signal), a synchronization signal (SS), or a discovery signal. The uplink reference signal is mainly used for uplink channel measurement or channel estimation, for example, the uplink reference signal may be a demodulation reference signal (DMRS) or a sounding reference signal (SRS).

It should be noted that a sentence that "a subframe n is used to transmit at least one of a downlink data channel, an uplink data channel, a downlink control channel, an uplink control channel, a downlink reference signal, and an uplink reference signal" occurs in 301 means that the subframe n is used to transmit information carried on the downlink data channel when the subframe n is used to transmit the downlink data channel is used as an example. For related description, refer to a technical standard (TS) 36.211 of the 3rd Generation Partnership Project (3GPP), and the meaning may be understood by a person of ordinary skill in the art.

Figure 4:
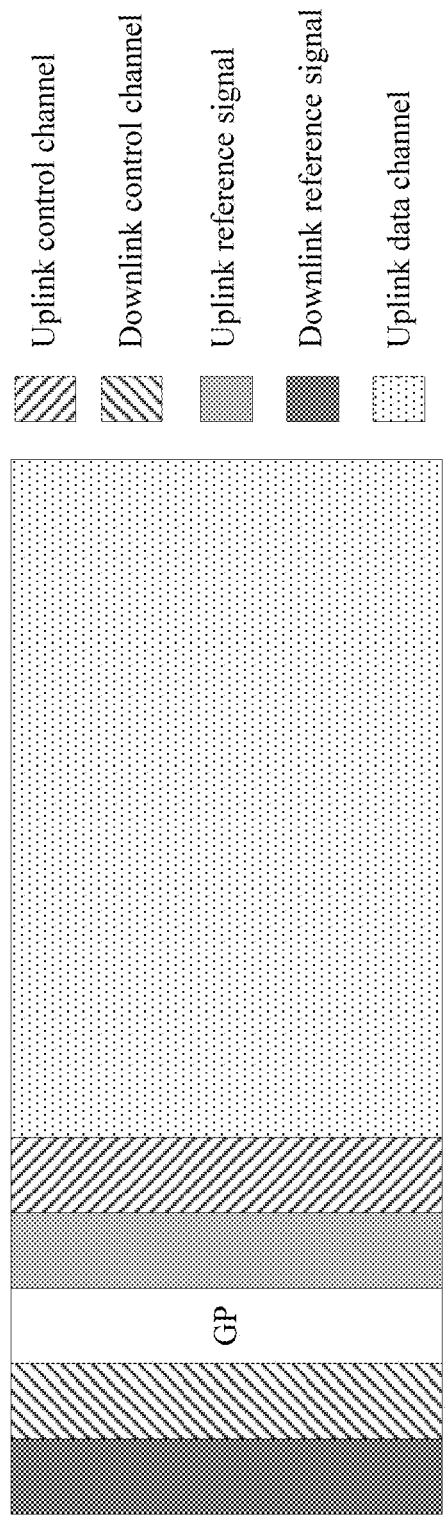
FIG. 4 shows a subframe structure according to an embodiment of the present application.

To achieve a technical effect of the present application, that a network device determines that a subframe n is used to transmit at least one of a downlink data channel, an uplink data channel, a downlink control channel, an uplink control channel, a downlink reference signal, and an uplink reference signal in 301 may include the following step:

The network device determines that the subframe n is used to transmit the uplink data channel, the downlink control channel, the uplink control channel, the downlink reference signal, and the uplink reference signal. In an implementation, the network device further determines a sequence of the foregoing channels and signals in time domain. As shown in FIG. 4, the subframe n is used, from front to back in time domain, to sequentially transmit the downlink reference signal, the downlink control channel, the uplink reference signal, the uplink control channel, and the uplink data channel. A GP may be configured between the downlink control channel and the uplink reference signal.

Figure 5:
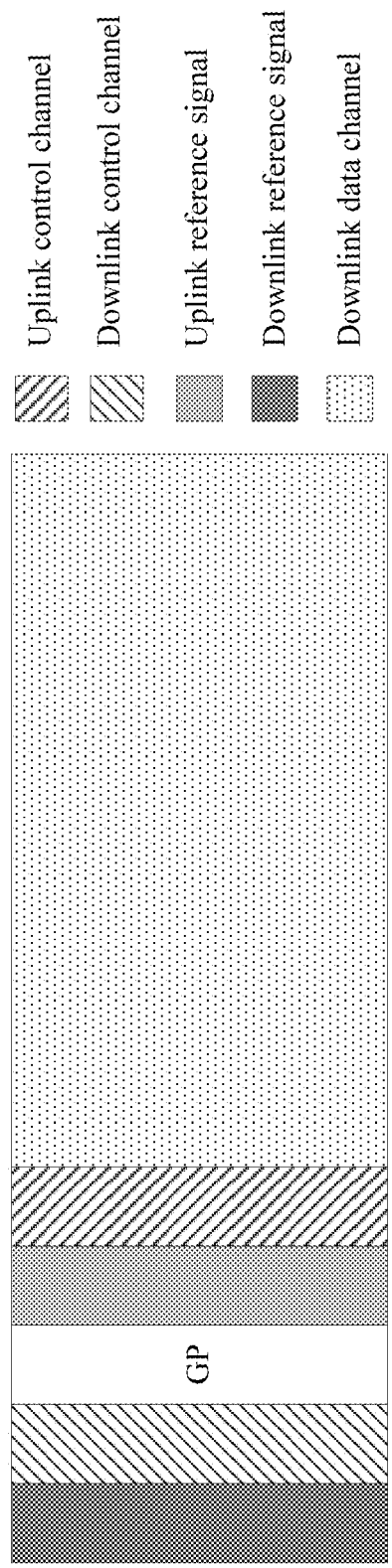
FIG. 5 shows another subframe structure according to an embodiment of the present application.

Alternatively, the network device determines that the subframe n is used to transmit the downlink data channel, the downlink control channel, the uplink control channel, the downlink reference signal, and the uplink reference signal. In an implementation, the network device further determines a sequence of the foregoing channels and signals in time domain. As shown in FIG. 5, the subframe n is used, from front to back in time domain, to sequentially transmit the downlink reference signal, the downlink control channel, the uplink reference signal, the uplink control channel, and the downlink data channel. The GP may be configured between the downlink control channel and the uplink reference signal.

Figure 6:
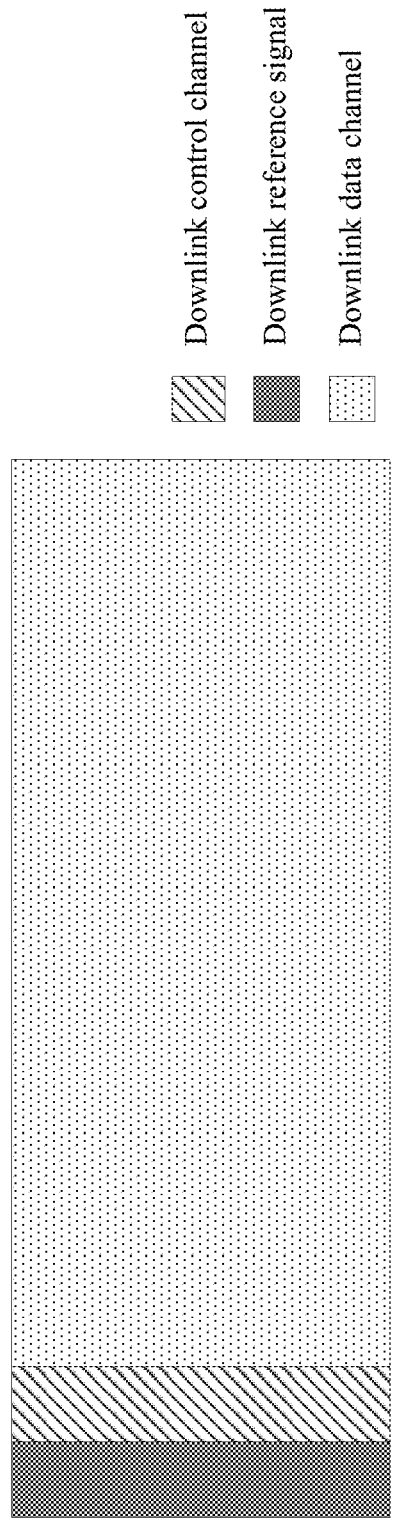
FIG. 6 shows a frame structure of another subframe according to an embodiment of the present application.

Alternatively, the network device determines that the subframe n is used to transmit the downlink reference signal, the downlink control channel, and the downlink data channel. In an implementation, the network device further determines a sequence of the foregoing channels and signals in time domain. As shown in FIG. 6, the subframe n is used, from front to back in time domain, to sequentially transmit the downlink reference signal, the downlink control channel, and the downlink data channel.

Figure 7:
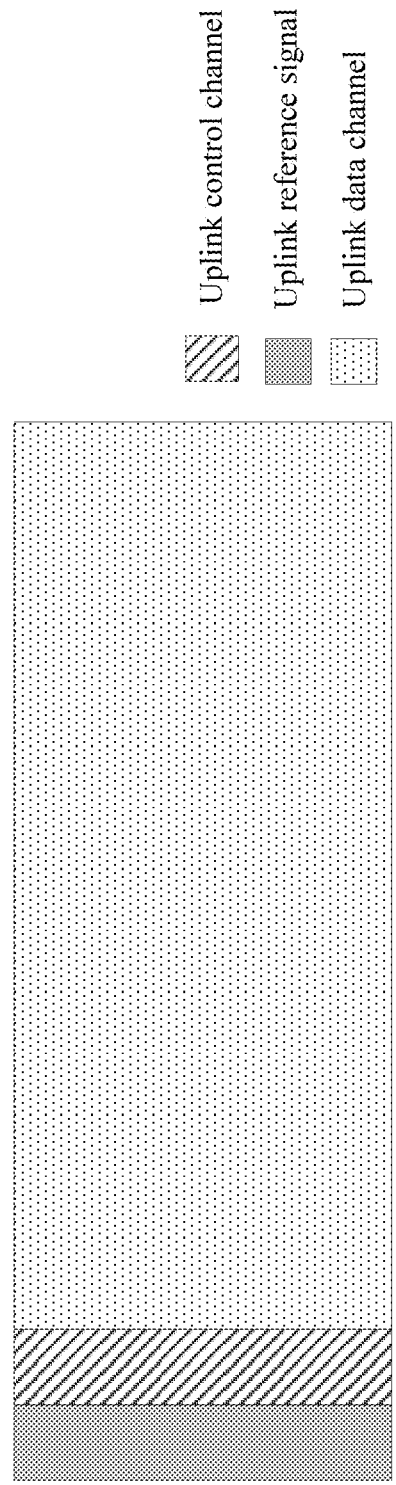
FIG. 7 shows a frame structure of another subframe according to an embodiment of the present application.

Alternatively, the network device determines that the subframe n is used to transmit an uplink reference channel, the uplink control channel, and the uplink data channel. In an implementation, the network device further determines a sequence of the foregoing channels and signals in time domain. As shown in FIG. 7, the subframe n is used, from front to back in time domain, to sequentially transmit the uplink reference signal, the uplink control channel, and the uplink data channel.

Figure 8:
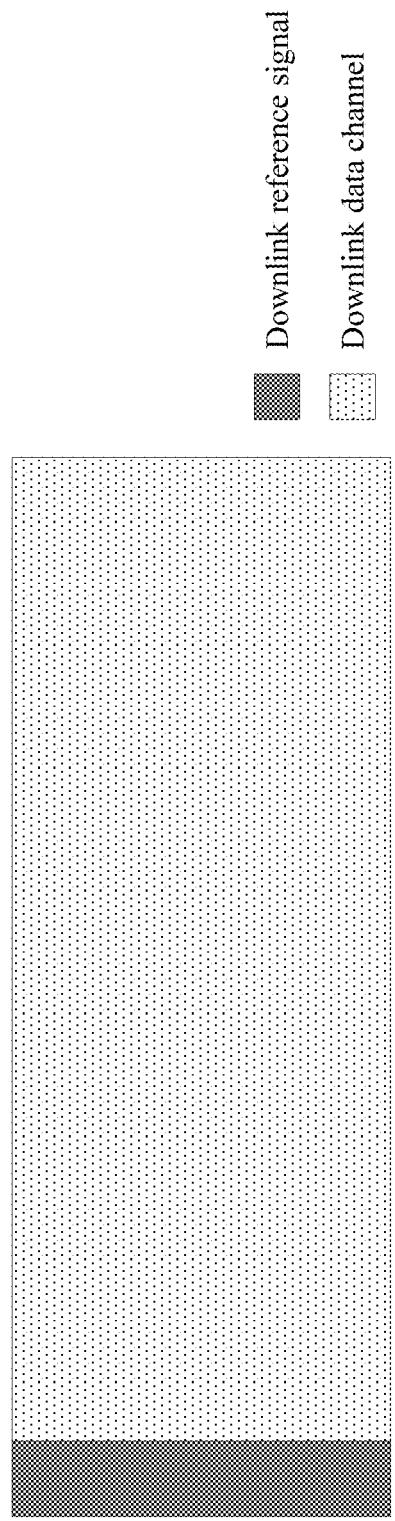
FIG. 8 shows a frame structure of another subframe according to an embodiment of the present application.

Alternatively, the network device determines that the subframe n is used to transmit the downlink reference signal and the downlink data channel. In an implementation, the network device further determines a sequence of the foregoing channels and signals in time domain. As shown in FIG. 8, the subframe n is used, from front to back in time domain, to sequentially transmit the downlink reference signal and the downlink data channel.

Figure 9:
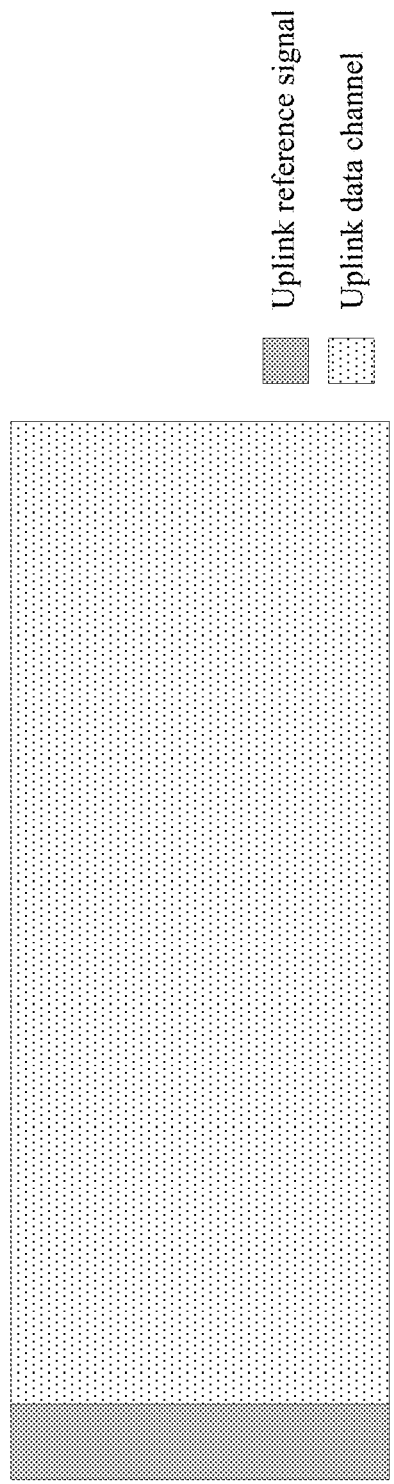
FIG. 9 shows a frame structure of another subframe according to an embodiment of the present application.

Alternatively, the network device determines that the subframe n is used to transmit the uplink reference signal and the uplink data channel. In an implementation, the network device further determines a sequence of the foregoing channels and signals in time domain. As shown in FIG. 9, the subframe n is used, from front to back in time domain, to sequentially transmit the uplink reference signal and the uplink data channel.

Alternatively, the network device determines that the subframe n is used to transmit the uplink data channel.

Alternatively, the network device determines that the subframe n is used to transmit the downlink data channel.

Figure 10:
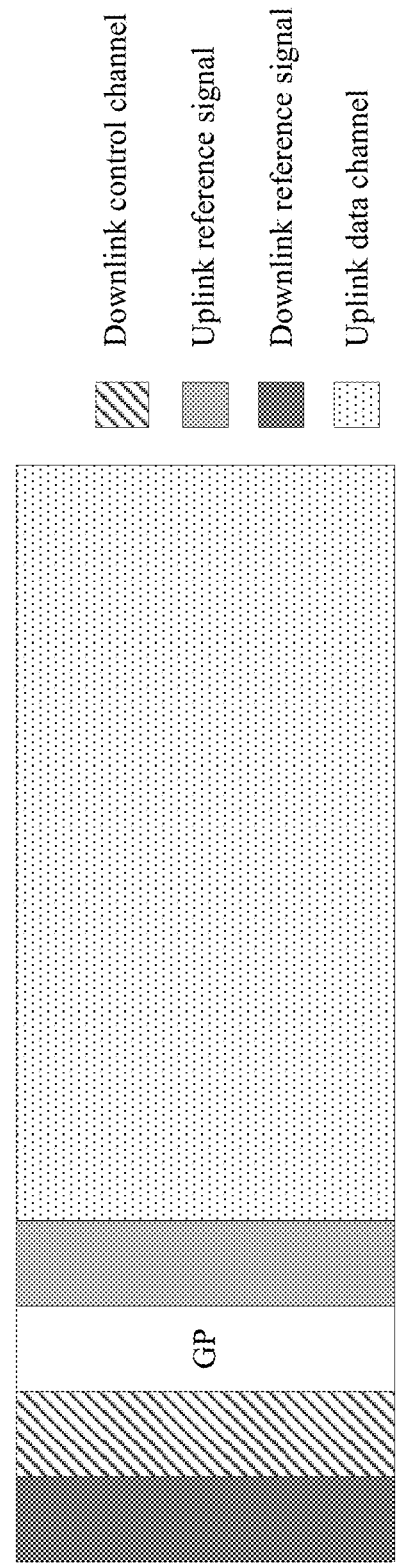
FIG. 10 shows a frame structure of another subframe according to an embodiment of the present application.

Alternatively, the network device determines that the subframe n is used to transmit the downlink reference signal, the downlink control channel, the uplink reference signal, and the uplink data channel. In an implementation, the network device further determines a sequence of the foregoing channels and signals in time domain. As shown in FIG. 10, the subframe n is used, from front to back in time domain, to sequentially transmit the downlink reference signal, the downlink control channel, the uplink reference signal, and the uplink data channel. The GP may be configured between the downlink control channel and the uplink reference signal.

Figure 11:
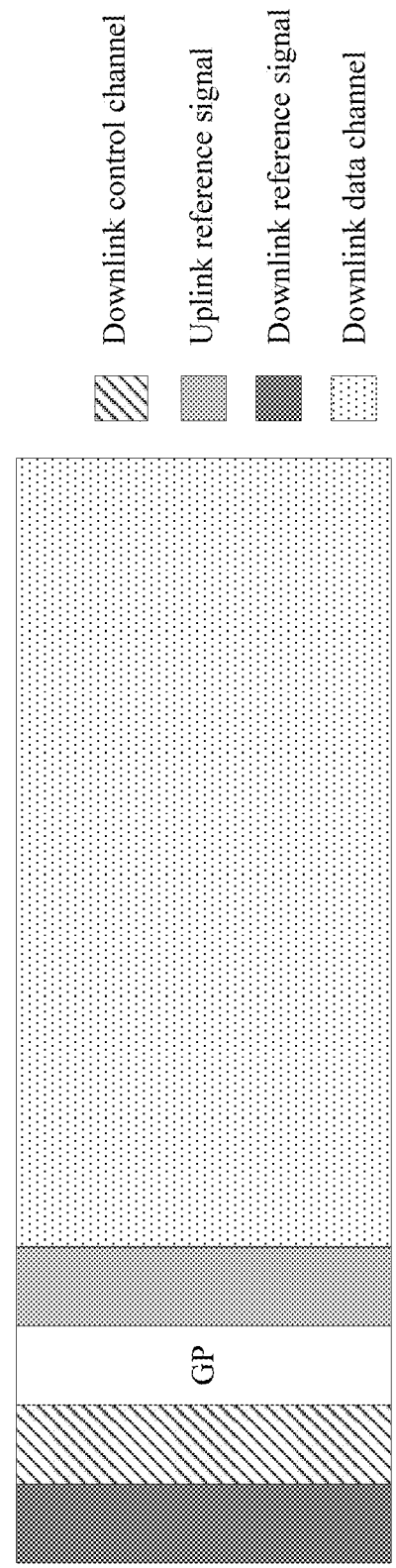
FIG. 11 shows a frame structure of another subframe according to an embodiment of the present application.
Figure 12:
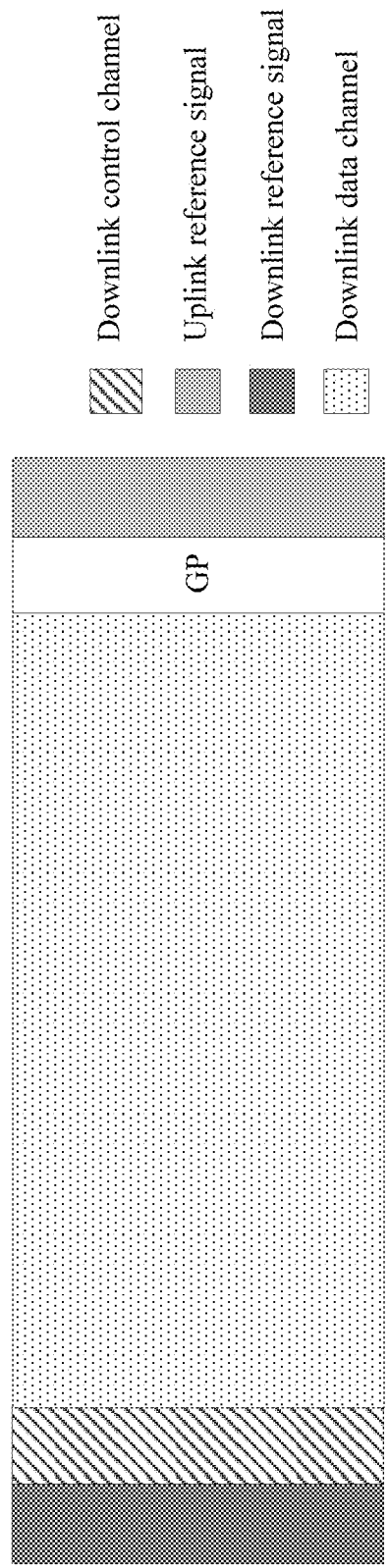
FIG. 12 shows a frame structure of another subframe according to an embodiment of the present application.

Alternatively, the network device determines that the subframe n is used to transmit the downlink reference signal, the downlink control channel, the uplink reference signal, and the uplink data channel. In an implementation, the network device further determines a sequence of the foregoing channels and signals in time domain. As shown in FIG. 11, the subframe n is used, from front to back in time domain, to sequentially transmit the downlink reference signal, the downlink control channel, the uplink reference signal, and the downlink data channel, where the GP may be configured between the downlink control channel and the uplink reference signal. As shown in FIG. 12, the subframe n may be used, from front to back in time domain, to sequentially transmit the downlink reference signal, the downlink control channel, the downlink data channel, and the uplink reference signal, where the GP may be configured between the downlink data channel and the uplink reference signal.

Figure 13:
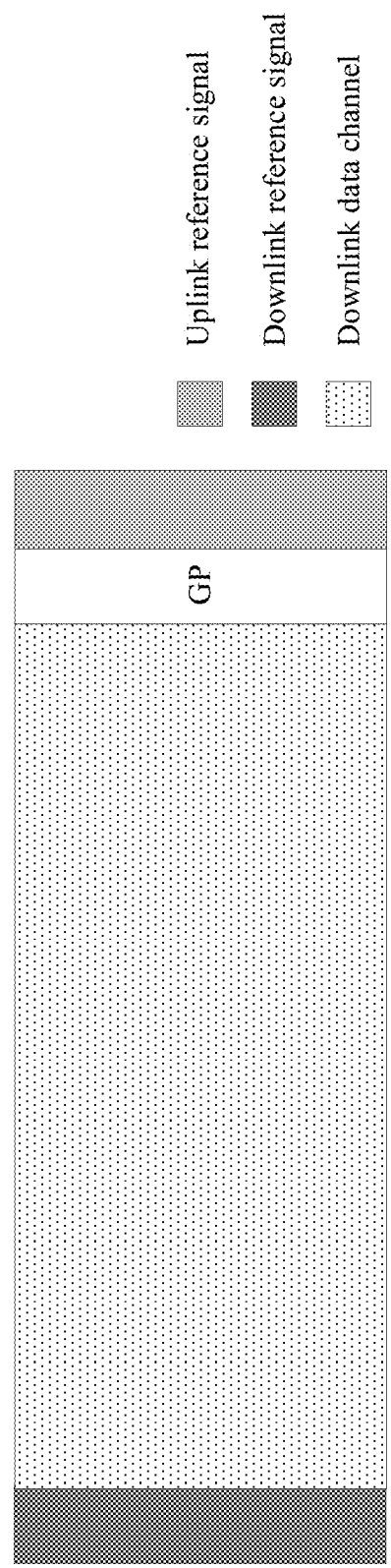
FIG. 13 shows a frame structure of another subframe according to an embodiment of the present application.

Alternatively, the network device determines that the subframe n is used to transmit the downlink reference signal, the uplink reference signal, and the downlink data channel. In an implementation, the network device further determines a sequence of the foregoing channels and signals in time domain. As shown in FIG. 13, the subframe n is used, from front to back in time domain, to sequentially transmit the downlink reference signal, the downlink data channel, and the uplink reference signal, The GP may be configured between the downlink data channel and the uplink reference signal.

For configuration of the GP, in an implementation, after configuring the GP, the network device performs indication on the terminal device by using configuration information (for example, indicating a time length of the GP), so that the terminal device learns the GP. Alternatively, in another implementation, the terminal device learns configuration information through predefining (for example, when a downlink channel or a downlink signal is converted to an uplink channel or an uplink signal).

The network device may flexibly configure a structure of the subframe n based on a current requirement. This improves scheduling flexibility of the network device.

The foregoing describes this embodiment of the present application from a perspective of composition of the subframe n. It may be learned that the foregoing descriptions are merely some examples used for description. The following describes this embodiment from a perspective of a channel and/or a signal.

Optionally, the network device determines that the subframe n is used to transmit at least the downlink reference signal, and the downlink reference signal may be located in first M symbols of the subframe n, where M is a positive integer, for example, a value of M is 1. In this way, the terminal device can perform channel estimation based on the received downlink reference channel as soon as possible. If the network device determines that the subframe n is further used to transmit the downlink control channel, in an implementation, the downlink control channel may be located in N symbols behind the downlink reference channel in time domain. N is a positive integer. Reference may be made to an arrangement manner of the downlink reference signal and the downlink control channel in time domain in FIG. 4, FIG. 5, or FIG. 6. In another implementation, the downlink reference signal and the downlink control channel are located on at least one identical symbol in time domain. In this case, the downlink reference signal is located on discontinuous subcarriers in frequency domain. For example, the downlink reference signal occupies one symbol, and the downlink control channel occupies a plurality of symbols. Therefore, in time domain, the downlink reference signal is located in the first symbol of the plurality of symbols occupied by the downlink control channel, and is located on discontinuous subcarriers of the first symbol in frequency domain.

Optionally, when the network device determines that the subframe n is used to transmit at least the uplink reference signal, the uplink reference signal may be located in the $k^{th}$ symbol (k is a positive integer) of the subframe n or first P symbols of the subframe n, where P is a positive integer, for example, a value of P is 1. In this way, the network device can perform channel estimation based on the received uplink reference channel as soon as possible. Reference may be made to an arrangement manner of the uplink reference signal in time domain in FIG. 9. For example, the uplink reference signal is located in the $k^{th}$ symbol (k is a positive integer greater than 2) of the subframe n as shown in FIG. 4, FIG. 5, FIG. 10, FIG. 11, and FIG. 12. When the uplink reference signal is located on at least two symbols, the at least two symbols may be continuous or discontinuous. The uplink reference signal may be located on discontinuous subcarriers in frequency domain. If the network device determines that the subframe n is further used to transmit the uplink control channel, in an implementation, the uplink control channel is located in O symbols behind the uplink reference channel in time domain. O is a positive integer. Reference may be made to an arrangement manner of the uplink reference signal and the uplink control channel in time domain in FIG. 7. In another implementation, the uplink reference signal and the uplink control channel are located on at least one identical symbol in time domain. In this case, the uplink reference signal is located on discontinuous subcarriers in frequency domain. For example, the uplink reference signal occupies one symbol, and the uplink control channel occupies a plurality of symbols. Therefore, in time domain, the uplink reference signal is located in the first symbol of the plurality of symbols occupied by the uplink control channel, and is located on discontinuous subcarriers of the first symbol in frequency domain.

It should be noted that the subframe n in this embodiment of the present application may be located on an FDD uplink frequency band, an FDD downlink frequency band, or a TDD frequency band.

302. The network device sends configuration information to a terminal device based on the determining, where the configuration information indicates that the subframe n is used to transmit at least one of the downlink data channel, the uplink data channel, the downlink control channel, the uplink control channel, the downlink reference signal, and the uplink reference signal.

In addition, the terminal device receives the configuration information.

Optionally, the configuration information is included in higher layer signaling. That is, the network device sends the higher layer signaling to the terminal device, the terminal device receives the higher layer signaling sent by the network device, and the higher layer signaling includes the configuration information.

Optionally, the configuration information is included in physical layer signaling. That is, the network device sends the physical layer signaling to the terminal device, the terminal device receives the physical layer signaling sent by the network device, and the physical layer signaling includes the configuration information. In an implementation, the network device may send the physical layer signaling to the terminal device based on a time period T, and the terminal device may receive, based on the time period T, the physical layer signaling sent by the network device. In addition, the network device may send signaling that indicates the time period T to the terminal device. After the time period T is configured, the terminal device does not need to frequently receive the physical layer signaling.

Optionally, the configuration information is included in scheduling signaling carried on the downlink control channel. That is, the network device sends the scheduling signaling carried on the downlink control channel to the terminal device, the terminal device receives the scheduling signaling that is sent by the network device and that is carried on the downlink control channel, and the scheduling signaling includes the configuration information. The scheduling signaling may be uplink grant (UL Grant) signaling or downlink assignment (DL assignment) signaling. The scheduling signaling includes uplink scheduling information and/or downlink scheduling information. For example, the network device sends the UL Grant signaling to the terminal device, and the UL Grant signaling is used to instruct the terminal device to send uplink data on the subframe n by using the uplink data channel. That is, the terminal device may learn, by using the UL Grant signaling, that the subframe n is used to transmit the uplink data channel.

303. Data transmission is performed between the terminal device and the network device on the subframe n.

As mentioned above, data may be a channel and/or a signal. Data transmission includes uplink data transmission and/or downlink data transmission, the uplink data transmission is uplink channel transmission and/or uplink signal transmission, and the downlink data transmission is downlink channel transmission and/or downlink signal transmission.

From a perspective of the network device, the network device performs data transmission between the network device and the terminal device on the subframe n. For example, the network device receives, on the subframe n, the uplink data sent by the terminal device; or the network device sends downlink data to the terminal device on the subframe n; or the network device receives, on the subframe n, the uplink data sent by the terminal device, and sends the downlink data to the terminal device.

From a perspective of the terminal device, the terminal device performs, based on the configuration information, data transmission between the terminal device and the network device on the subframe n. After receiving the configuration information, the terminal device may obtain a frame structure of the subframe n by reading content in the configuration information, so as to perform data transmission between the terminal device and the network device on the subframe n. For example, the terminal device receives, on the subframe n, the downlink data sent by the network device; or the terminal device sends the uplink data to the network device on the subframe n; or the terminal device receives, on the subframe n, the downlink data sent by the network device, and sends the uplink data to the network device.

The following describes the step based on several implementations.

1. The Subframe n is Used to Transmit at Least the Uplink Reference Signal.

The performing, by the terminal device, data transmission between the terminal device and the network device on the subframe n specifically includes: sending, by the terminal device, the uplink reference signal to the network device on the subframe n, where the uplink reference signal is used for downlink channel measurement, and the subframe n is located on an FDD uplink frequency band or an FDD downlink frequency band.

After 303, the method may further include the following steps.

The network device performs downlink channel measurement based on the uplink reference signal received from the terminal device. The network device configures downlink scheduling information based on a result of the downlink channel measurement, where the downlink scheduling information is used to instruct the network device to send, on a subframe (n+k) (k is a positive integer), downlink data to the terminal device. Before sending the downlink data that is on the subframe (n+k) to the terminal device, the network device may send the downlink scheduling information to the terminal device at the same time. Subsequently, the terminal device receives, on the subframe (n+k) based on the downlink scheduling information, the downlink data sent by the network device.

Both the subframe n and the subframe (n+k) are located on the FDD uplink frequency band or the FDD downlink frequency band.

In an existing FDD system, the uplink reference signal such as an SRS is used for only uplink channel measurement. In addition, the network device can learn a downlink channel state only after receiving downlink CSI sent by the terminal device. In this embodiment of the present application, the FDD uplink frequency band is not limited to being used to transmit an uplink signal or an uplink channel (for example, the downlink data channel exists on the subframe (n+k)), and the FDD downlink frequency band is not limited to being used to transmit a downlink signal or a downlink channel (for example, the uplink reference signal exists on the subframe n). That is, the terminal device may send the uplink reference signal on the FDD downlink frequency band, or the terminal device may send the downlink data on the FDD uplink frequency band. In this way, the network device may use channel reciprocity, and the network device may measure, by using the uplink reference signal sent by the terminal device, the downlink channel on the FDD frequency band to estimate the downlink channel state. This manner facilitates a Multiple Input Multiple Output (MIMO) layout.

2. The Subframe n is Used to Transmit at Least the Uplink Control Channel.

1) The performing, by the terminal device, data transmission between the terminal device and a network device on the subframe n specifically includes: sending, by the terminal device on the subframe n, HARQ response information carried on the uplink control channel to the network device, where the HARQ response information is used to indicate a receiving state of downlink data received by the terminal device on a subframe (n−k), where k is a positive integer. The HARQ response information includes acknowledgement (ACK), negative acknowledgement (NACK), and discontinuous transmission (DTX). ACK indicates that the downlink data is properly received, NACK indicates that the downlink data is improperly received, and DTX indicates that the downlink data is not received.

Optionally, the subframe n and the subframe (n−k) may be located on frequency bands of a same type. For example, both the subframe n and the subframe (n−k) are located on the TDD frequency band, the FDD uplink frequency band, or the FDD downlink frequency band. It should be noted that even if the subframe n and the subframe (n−k) are located on frequency bands of a same type, the subframe n and the subframe (n−k) may occupy different carriers, that is, the downlink data and the HARQ response information are located on different carriers.

Optionally, the subframe n and the subframe (n−k) are located on frequency bands of different types. For example, the subframe n is located on the FDD uplink frequency band, and the subframe (n−k) is located on the FDD downlink frequency band. For another example, the subframe n is located on the FDD downlink frequency band, and the subframe (n−k) is located on the FDD uplink frequency band. For another example, the subframe n is located on the TDD frequency band, and the subframe (n−k) is located on the FDD uplink frequency band, or the subframe (n−k) is located on the FDD downlink frequency band. For another example, the subframe n is located on the FDD uplink frequency band, or the subframe n is located on the FDD downlink frequency band, and the subframe (n−k) is located on the TDD frequency band.

The variable k is a positive integer, and values of k are the same for an FDD uplink frequency band, an FDD downlink frequency band, and a TDD frequency band. That is, HARQ timing of an FDD frequency band and HARQ timing of a TDD frequency band are the same. As a result, designs of the communications system tend to be unified, and complexity of the communications system is reduced.

Optionally, when k=1, a HARQ feedback speed is highest. This may reduce a communication latency.

Specific examples are used for further description.

Figure 14:
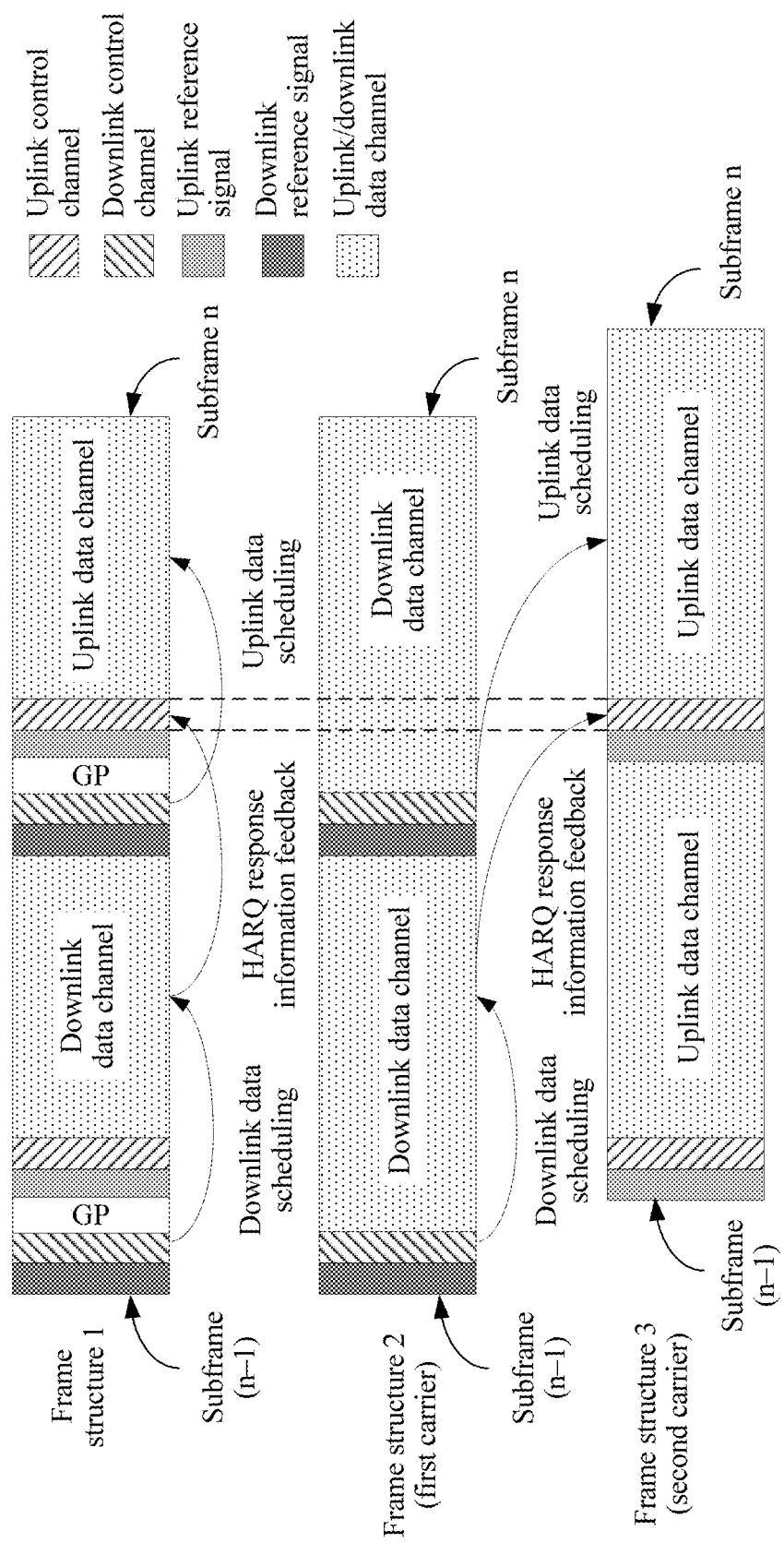
FIG. 14 shows a frame structure design of a subframe according to an embodiment of the present application.

To ensure that HARQ timing and scheduling timing in different frame structures are the same, a frame structure design shown in FIG. 14 may be used.

In a frame structure 1, a subframe (n−1) is used, from front to back in time domain, to sequentially transmit the downlink reference signal, the downlink control channel, the uplink reference signal, the uplink control channel, and the downlink data channel, and the GP is configured between the downlink control channel and the uplink reference signal. The subframe n is used, from front to back in time domain, to sequentially transmit the downlink reference signal, the downlink control channel, the uplink reference signal, the uplink control channel, and the uplink data channel, and the GP is configured between the downlink control channel and the uplink reference signal. Scheduling timing and HARQ timing in the frame structure 1 include at least one of the following timing: The downlink control channel on the subframe (n−1) may be used to schedule the downlink data channel on the subframe (n−1); the uplink control channel on the subframe n may be used to carry the HARQ response information, and the HARQ response information is used to indicate a receiving state of the downlink data that is received by the terminal device on the subframe (n−1); and the downlink control channel on the subframe n may be used to schedule the uplink data channel on the subframe n. It should be noted that the subframe (n−1) and the subframe n in FIG. 14 are located on a same carrier, however, the subframe (n−1) and the subframe n may also be located on different carriers. This is not limited in this embodiment.

Frame structures 2 and 3 may be used together. A subframe with the frame structure 2 and a subframe with the frame structure 3 are located on different carriers. In the frame structure 2, the subframe n and the subframe (n−1) are used, from front to back in time domain, to sequentially transmit the downlink reference channel, the downlink control channel, and the downlink data channel. In the frame structure 3, the subframe n and the subframe (n−1) are used, from front to back in time domain, to sequentially transmit the uplink reference channel, the uplink control channel, and the uplink data channel. Scheduling timing and HARQ timing in the frame structures 2 and 3 include at least one of the following timing: A downlink control channel on a subframe (n−1) of a first carrier may be used to schedule a downlink data channel on a subframe (n−1) of the first carrier; an uplink control channel on a subframe n of a second carrier may be used to carry HARQ response information, and the HARQ response information is used to indicate a receiving state of downlink data that is received on the subframe (n−1) of the first carrier; or the downlink control channel on the subframe n of the first carrier may be used to schedule the uplink data channel on the subframe n of the second carrier. The first carrier and the second carrier are located at different carrier frequencies. The first carrier and the second carrier may be located on a same frequency band, or may be located on different frequency bands.

Further, timing on the second carrier lags behind timing on the first carrier, that is, a start time point of the subframe n on the second carrier is later than a start time point of the subframe n on the first carrier, and a time offset T exists between two start time points. In this way, the terminal device may have enough processing time to decode the downlink data and generate the HARQ response information. In an implementation, the time offset T is equal to a total time occupied by the downlink reference signal, the downlink control channel, and the GP in the frame structure 1. HARQ time sequences in different frame structures may be totally consistent based on a timing lag. As shown in FIG. 14, it is implemented that the uplink control channel of the subframe n in the frame structure 1 and the uplink control channel of the subframe n in the frame structure 3 are totally aligned in time domain based on a timing lag. Therefore, designs of the communications system are totally unified.

Figure 15:
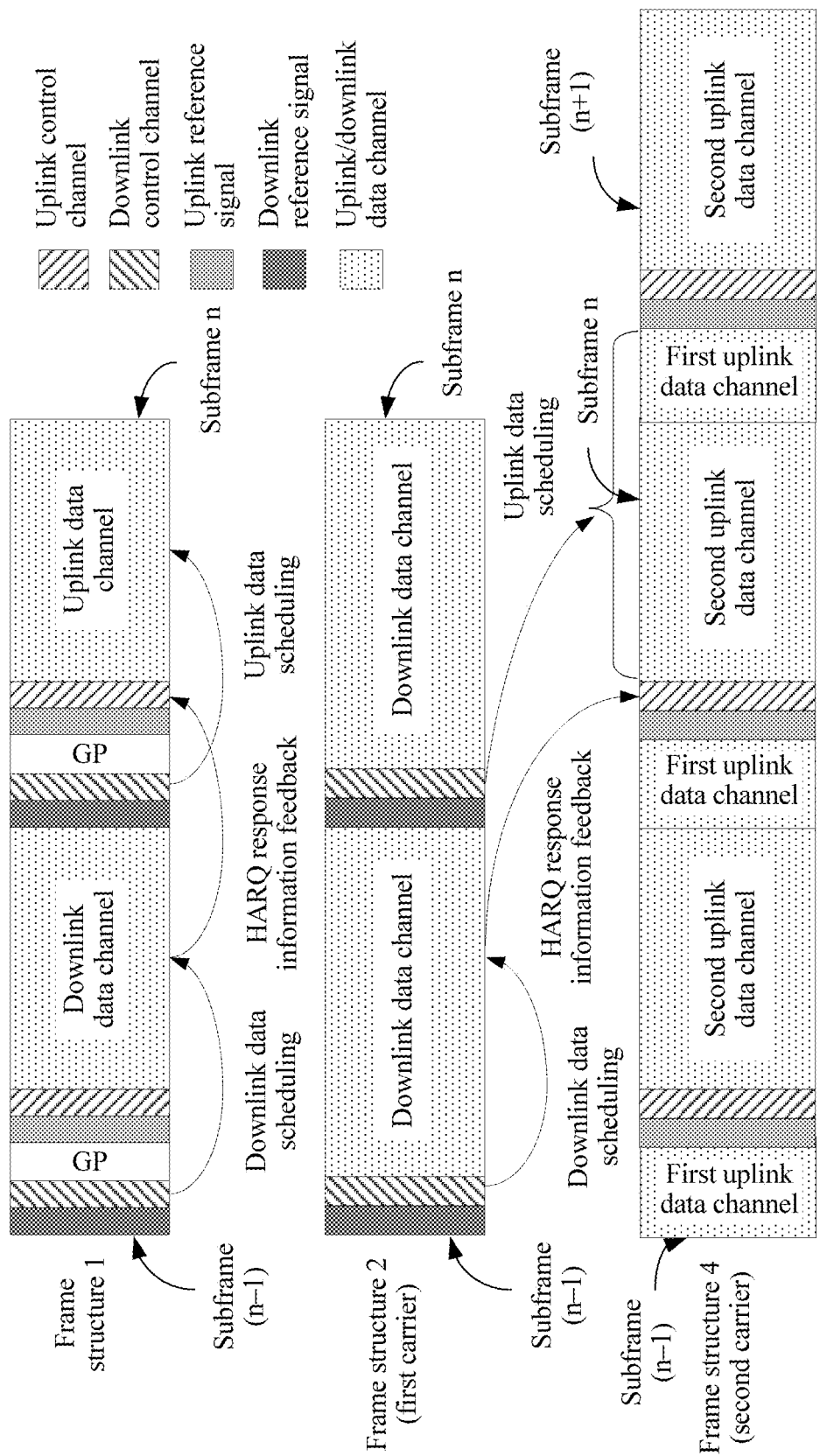
FIG. 15 shows a frame structure design of another subframe according to an embodiment of the present application.

Certainly, to achieve the total consistency, in addition to changing timing of a subframe on the second carrier, design of a frame structure 4 may further be applied to a subframe on the second carrier. As shown in FIG. 15, a subframe (n−1), a subframe n, and a subframe (n+1) on the second carrier are used, from front to back in time domain, to sequentially transmit a first uplink data channel, the uplink reference signal, the uplink control channel, and a second uplink data channel. That is, the uplink data channel is divided into the first uplink data channel and the second uplink data channel, which are distributed on one side of the uplink reference signal and one side of the uplink control channel. In this way, it is implemented that the uplink control channel of the subframe n in the frame structure 1 and the uplink control channel of the subframe n in the frame structure 4 are totally aligned in time domain. In addition, the downlink control channel on the subframe n of the first carrier may be used to schedule the second uplink data channel on the subframe n and the first uplink data channel on the subframe (n+1) of the second carrier. Other specific implementations are the same as the embodiment shown in FIG. 14.

Optionally, the foregoing frame structure 1 is applied to the TDD frequency band; the frame structure 2 is applied to the FDD downlink frequency band, that is, the first carrier is located on the FDD downlink frequency band; and the frame structure 3 and/or the frame structure 4 is applied to the FDD uplink frequency band, that is, the second carrier is located on the FDD uplink frequency band. In this way, the terminal device may use same HARQ timing or same scheduling timing on the TDD frequency band or on the FDD frequency band.

2) The performing, by the terminal device, data transmission between the terminal device and a network device on the subframe n specifically includes: sending, by the terminal device on the subframe n, CSI carried on the uplink control channel or the uplink data channel to the network device. Reporting period parameters of the CSI for the FDD uplink frequency band, the FDD downlink frequency band, and the TDD frequency band are the same.

In the prior art, the FDD frequency band and the TDD frequency band use different frame structures, and therefore, reporting periods of the CSI are separately configured based on different frequency bands (the FDD frequency band or the TDD frequency band) and are different from each other. However, in this embodiment of the present application, any subframe on the FDD frequency band and any subframe on the TDD frequency band may be configured, based on a requirement, to be used to transmit at least the uplink control channel. Therefore, it can be implemented that reporting period parameters of the CSI for the FDD uplink frequency band, the FDD downlink frequency band, and the TDD frequency band are the same.

In an implementation, when each subframe is used to transmit at least the uplink control channel in time domain, a reporting period of the CSI may be a length of one subframe. In this way, the network device may learn latest channel state information by using CSI sent by the terminal device, so as to configure accurate downlink scheduling information.

3. The Subframe n is Used to Transmit at Least the Uplink Data Channel.

The performing, by the terminal device, data transmission between the terminal device and a network device on the subframe n includes: sending, by the terminal device, the uplink data channel on the subframe n to the network device (that is, sending the uplink data carried on the uplink data channel). The uplink data is sent based on the uplink scheduling information that is received by the terminal device on the subframe (n−k).

Before 303, the method may further include: sending, by the network device, uplink scheduling information on the subframe (n−k), where the uplink scheduling information is used to instruct the terminal device to send uplink data on the subframe n.

The subframe n and the subframe (n−k) may be located on frequency bands of a same type or frequency bands of different types. For details, refer to the foregoing related description. k is an integer ≥0, and values of k are the same for an FDD uplink frequency band, an FDD downlink frequency band, and a TDD frequency band. That is, uplink data scheduling latency of the FDD frequency band is the same as uplink data scheduling latency of the TDD frequency band. As a result, designs of the communications system tend to be unified, and complexity of the communications system is reduced.

Optionally, when k=0, lowest uplink data scheduling latency may be implemented. In this case, if the frame structures 2 and 4 shown in FIG. 15 are used, the downlink control channel on the subframe n of the first carrier may be used to schedule the second uplink data channel on the subframe n and the first uplink data channel on the subframe (n+1) of the second carrier. That is, the terminal device may send the second uplink data channel on the subframe n and the first uplink data channel on the subframe (n+1) to the network device based on the uplink scheduling information.

4. The Subframe n is Used to Transmit at Least the Downlink Data Channel.

The performing, by the terminal device, data transmission between the terminal device and a network device on the subframe n specifically includes: receiving, by the terminal device on the subframe n, the downlink data channel (that is, the downlink data carried on the downlink data channel) sent by the network device.

In an implementation, the subframe is further used to transmit the downlink control channel. The performing, by the terminal device, data transmission between the terminal device and a network device on the subframe n further includes: receiving, by the terminal device on the downlink control channel of the subframe n, the downlink scheduling information sent by the network device, where the downlink scheduling information is used to schedule the downlink data in the downlink data channel on the subframe n; and in this case, receiving, by the terminal device on the downlink data channel of the subframe n based on the downlink scheduling information, the downlink data sent by the network device. In this implementation, fastest scheduling of the downlink data is implemented.

According to the technical solution provided in this embodiment of the present application, the network device determines a channel and/or a signal existing on the subframe n, and the terminal device implements data transmission between the terminal device and the network device on the subframe n by obtaining the channel and/or the signal existing on the subframe n. Because of the channel and/or the signal existing on the subframe n, a same duplex mode may be used on the FDD frequency band and the TDD frequency band, so that designs of the communications system are unified. Compared with the prior art, the terminal device does not need to distinguish between different duplex modes, and does not need to perform communication based on different duplex modes. This simplifies designs of the communications system and improves communication efficiency.

Figure 16:
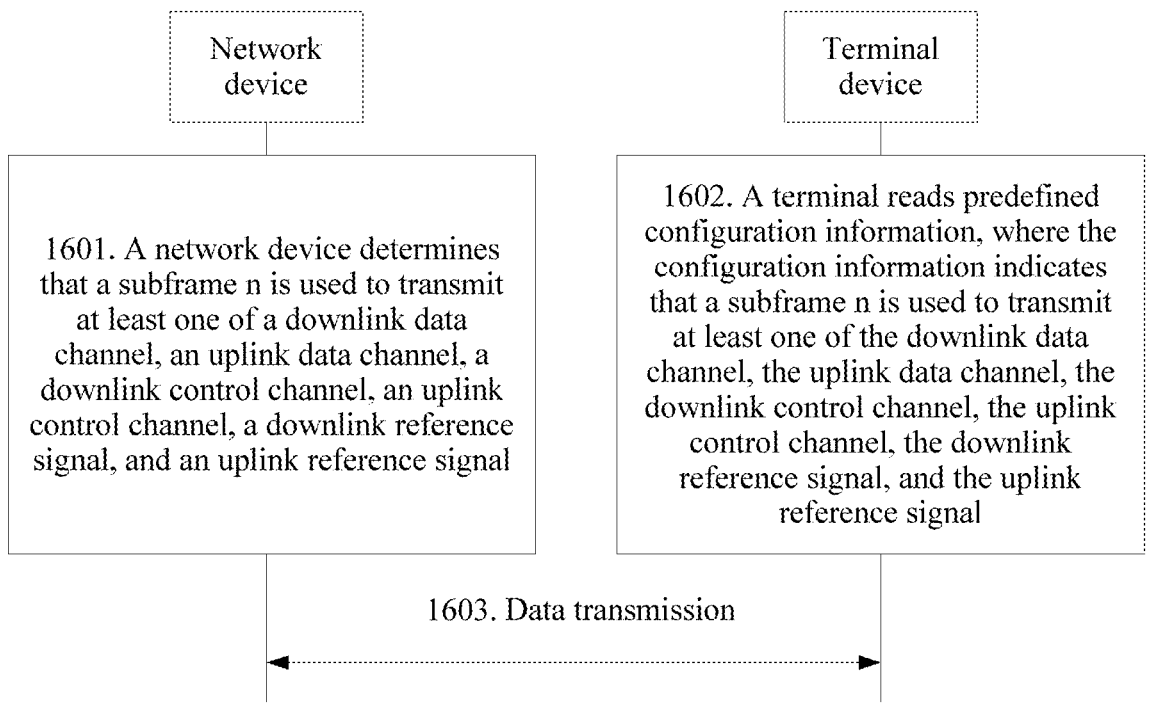
FIG. 16 is a flowchart of another data transmission method according to an embodiment of the present application.

FIG. 16 is a flowchart of a data transmission method according to an embodiment of the present application. The method may be applied to the application scenario shown in FIG. 1, and the method includes the following.

1601. A network device determines that a subframe n is used to transmit at least one of a downlink data channel, an uplink data channel, a downlink control channel, an uplink control channel, a downlink reference signal, and an uplink reference signal.

1602. A terminal reads predefined configuration information, where the configuration information indicates that a subframe n is used to transmit at least one of the downlink data channel, the uplink data channel, the downlink control channel, the uplink control channel, the downlink reference signal, and the uplink reference signal.

1603. The terminal device performs data transmission between the terminal device and the network device on the subframe n based on the configuration information.

In this embodiment of the present application, different from a manner of obtaining the configuration information by the terminal of the embodiment of the present application shown in FIG. 3, the terminal obtains the configuration information through predefining. For example, predefined configuration information may be stored in a memory of the terminal, and is obtained by the terminal when it is needed. Certainly, it should be ensured that a same frame on a same carrier of a same frequency band that is on a network device side is consistent with that on a terminal device side, that is, a frame structure of a same frame on a same carrier of a same frequency band on the network device side is the same as that on the terminal device side. Other implementations of this embodiment of the present application are the same as the embodiment of FIG. 3, and reference may be made to the embodiment of FIG. 3. Details are not described herein again.

A communications system to which technical solutions provided in each embodiment of the present application are applied uses transparent duplex, and the transparent duplex is a duplex mode in which FDD and TDD do not need to be distinguished. The transparent duplex is applicable to the FDD uplink frequency band, the FDD downlink frequency band, and the TDD frequency band. That is, the FDD uplink frequency band, the FDD downlink frequency band, and the TDD frequency band use a duplex mode of transparent duplex.

In the prior art, the terminal device learns that a current duplex mode is TDD or FDD by detecting a synchronization signal. After the transparent duplex is used, a synchronization signal on the TDD frequency band and a synchronization signal on the FDD downlink frequency band do not need to be distinguished. That is, a structure of the synchronization signal is not used to identify the FDD and the TDD. Therefore, time domain resource locations of a synchronization signal detected by the terminal device may be the same for the FDD uplink frequency band, the FDD downlink frequency band, and the TDD frequency band, that is, a resource location of the synchronization signal is not needed to identify a duplex mode used by the system.

The foregoing mainly describes the solution provided in this embodiment of the present application from a perspective of interaction between network elements. It may be understood that, to implement the foregoing function, the network elements, such as the terminal device and the network device, include a corresponding hardware structure and/or software module that is used to perform each function. A person skilled in the art may be easily aware that, in combination with units and algorithm steps of the examples described in the embodiments disclosed in this specification, the present application may be implemented by hardware or a combination of hardware and computer software. Whether a function is performed by hardware or in a manner in which computer software drives hardware depends on particular applications and design constraint conditions of the technical solutions. A person skilled in the art may use different methods to implement the described functions for each particular application, but it should not be considered that the implementation goes beyond the scope of the present application.

Figure 17:
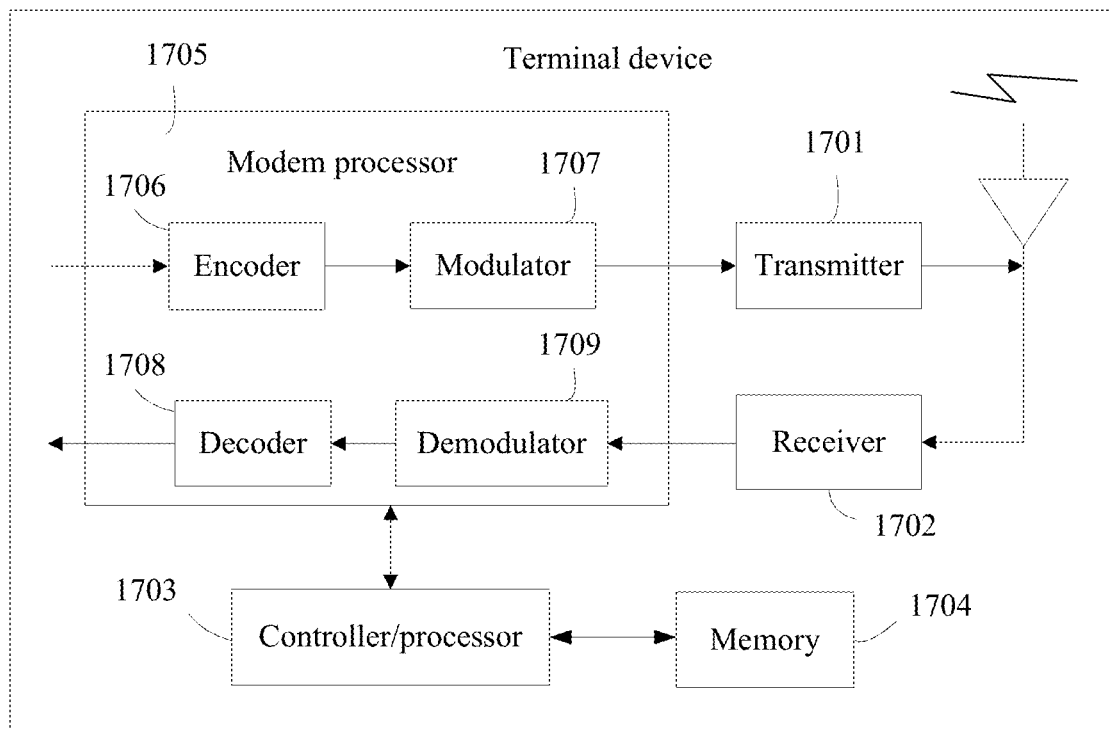
FIG. 17 is a schematic structural diagram of a terminal device according to an embodiment of the present application.

FIG. 17 shows a simplified schematic diagram of a possible designed structure of a terminal device in the foregoing embodiment. The terminal includes a transmitter 1701, a receiver 1702, a controller/processor 1703, a memory 1704, and a modem processor 1705.

The transmitter 1701 adjusts (such as through analog conversion, filtering, amplification, and up-conversion) an output sampling and generates an uplink signal. The uplink signal is transmitted to the network device in the foregoing embodiment by an antenna. In a downlink, the antenna receives a downlink signal transmitted by an access network device in the foregoing embodiment. The receiver 1702 adjusts (such as through filtering, amplification, down-conversion, and digitization) a signal received from the antenna and provides an input sampling. In the modem processor 1705, an encoder 1706 receives service data and a signaling message to be sent in the uplink, and processes (such as through formatting, coding, and interleaving) the service data and the signaling message. A modulator 1707 further processes (such as through symbol mapping and modulation) the service data and the signaling message that are encoded, and provides an output sampling. A demodulator 1709 processes (such as through demodulation) the input sampling and provides symbol estimation. A decoder 1708 processes (such as through de-interleaving and decoding) the symbol estimation and provides the data and the signaling message that are decoded and that are sent to the terminal. The encoder 1706, the modulator 1707, the demodulator 1709, and the decoder 1708 may be implemented by a combined modem processor 1705. These units perform processing based on a radio access technology (such as an access technology of LTE or another evolution system) used by a radio access network.

The controller/processor 1703 performs control and management on actions of the terminal device, is configured to perform processing that is performed by the terminal device in the foregoing embodiment, and controls the transmitter 1701 and the receiver 1702 to complete actions that are performed by the terminal device in FIG. 3 and FIG. 16. The memory 1704 is configured to store program code and data of the terminal device.

Figure 18:
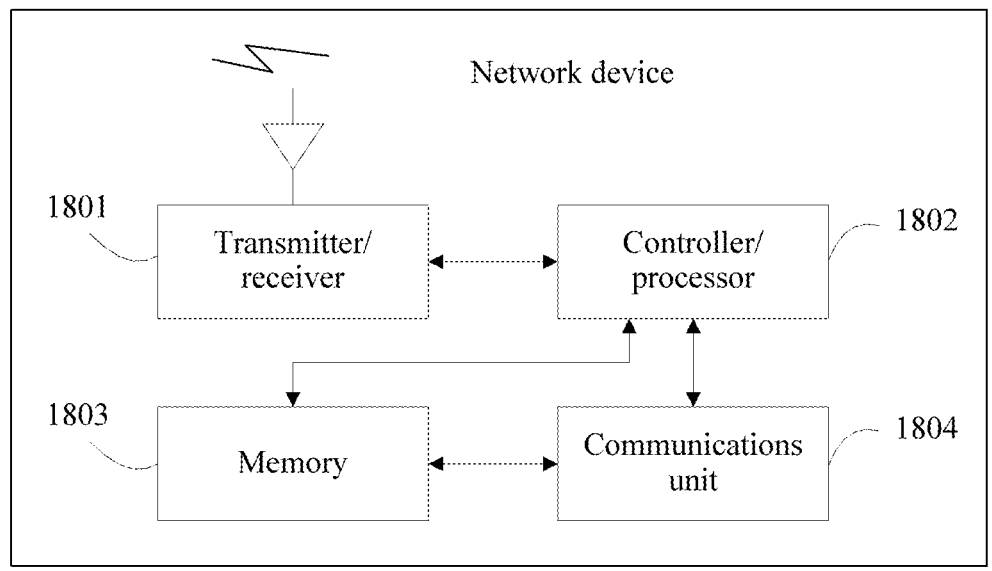
FIG. 18 is a schematic structural diagram of a network device according to an embodiment of the present application.

FIG. 18 shows a possible schematic structural diagram of a network device in the foregoing embodiment.

The network device includes a transmitter/receiver 1801, a controller/processor 1802, a memory 1803, and a communications unit 1804. The transmitter/receiver 1801 is configured to support information receiving and sending between the network device and the terminal device in the foregoing embodiment, and support radio communication between the terminal device and another terminal device. The controller/processor 1802 is configured to perform various functions for communicating with the terminal. In an uplink, an uplink signal from the terminal device is received by an antenna, is demodulated by the receiver 1801, and further is processed by the controller/processor 1802 to restore service data and signaling information sent by the terminal. In a downlink, service data and a signaling message are processed by the controller/processor 1802, and are demodulated by the transmitter 1801 to generate a downlink signal. The downlink signal is transmitted to the terminal device by the antenna. The controller/processor 1802 is further configured to perform a processing process that relates to the network device in FIG. 3 and FIG. 16 and/or another process of technologies described in this application. The memory 1803 is configured to store program code and data of the network device. The communications unit 1804 is configured to support communication between the network device and another network device.

It may be understood that FIG. 18 merely shows a simplified design of the network device. In practical application, the network device may include any quantity of transmitters, receivers, processors, controllers, memories, communications units, and the like, and all access network devices that can implement the present application fall within the protection scope of the present application.

Figure 19:
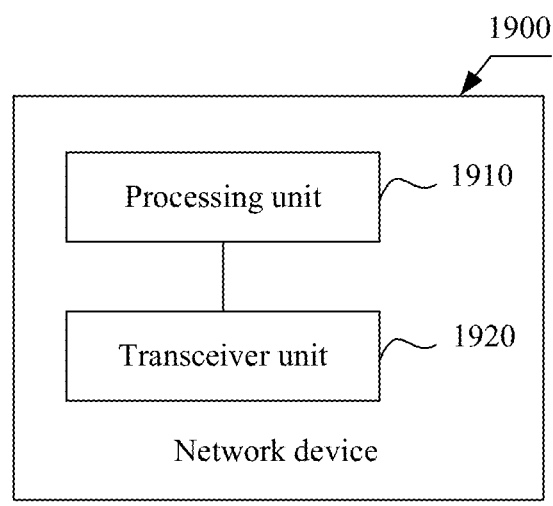
FIG. 19 is another schematic structural diagram of a terminal device according to an embodiment of the present application.

FIG. 19 shows a network device 1900 according to an embodiment of the present application. The network device 1900 may include a processing unit 1910 and a transceiver unit 1920. The processing unit 1910 can implement a function of a controller/processor 1802 of the network device in FIG. 18. The transceiver unit 1920 can implement a function of a transmitter/receiver 1801 of the network device in FIG. 18.

Figure 20:
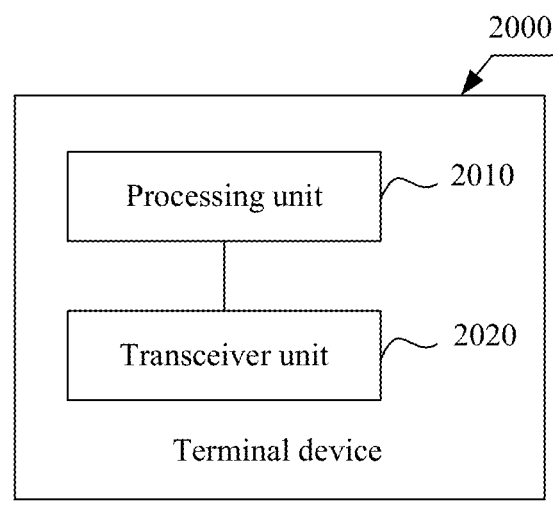
FIG. 20 is another schematic structural diagram of a network device according to an embodiment of the present application.

FIG. 20 shows a terminal device 2000 according to an embodiment of the present application. The terminal device 2000 may include a processing unit 2010 and a transceiver unit 2020. The processing unit 2010 can implement a function of a controller/processor 1703 of the terminal device in FIG. 17. The transceiver unit 2020 can implement functions of a transmitter 1701 and a receiver 1702 of the terminal in FIG. 17.

A person skilled in the art may further understand that various illustrative logical blocks and steps that are listed in the embodiments of the present application may be implemented by using electronic hardware, computer software, or a combination thereof. In order to clearly display the interchangeability between the hardware and the software, functions of the foregoing various illustrative components and steps have been generally described. Whether the functions are implemented by using hardware or software depends on particular applications and a design requirement of the entire system. A person of ordinary skill in the art may use various methods to implement the described functions for each particular application, but it should not be considered that the implementation goes beyond the scope of the embodiments of the present application.

The various illustrative logical blocks, modules, and circuits described in the embodiments of the present application may implement or operate the described functions by using a general processing unit, a digital signal processing unit, an application-specific integrated circuit (ASIC), a field programmable gate array (FPGA) or another programmable logical apparatus, a discrete gate or transistor logic, a discrete hardware component, or a design of any combination thereof. The general processing unit may be a microprocessing unit. Optionally, the general processing unit may be any conventional processing unit, controller, microcontroller, or state machine. The processing unit may be implemented by a combination of computing apparatuses, such as a digital signal processing unit and a microprocessing unit, a plurality of microprocessing units, one or more microprocessing units with a digital signal processing unit core, or any other similar configuration.

Steps of the methods or algorithms described in the embodiments of the present application may be directly embedded into hardware, a software module executed by a processing unit, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processing unit so that the processing unit may read information from the storage medium and write information to the storage medium. Alternatively, the storage medium may further be integrated into a processing unit. The processing unit and the storage medium may be arranged in an ASIC, and the ASIC may be arranged in a user terminal. Alternatively, the processing unit and the storage medium may be arranged in different components of the user terminal.

In one or more example designs, the functions described in the embodiments of the present application may be implemented by using hardware, software, firmware, or any combination thereof. If the present application is implemented by software, these functions may be stored in a computer-readable medium or are transmitted to the computer-readable medium in a form of one or more instructions or code. The computer-readable medium is either a computer storage medium or a communications medium that enables a computer program to move from one place to another. The storage medium may be an available medium that may be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of an instruction or a data structure or in a form that can be read by a general or special computer or a general or special processing unit. In addition, any connection may be appropriately defined as a computer-readable medium. For example, if software is transmitted from a website, a server, or another remote resource by using a coaxial cable, an optical fiber, a twisted pair, a digital subscriber line (DSL) or in a wireless manner, such as infrared, radio, or microwave, the software is included in a defined computer-readable medium. The disc and the disk include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

According to the foregoing description of this specification in the present application, technologies in the art may use or implement the content of the present application. Any modification based on the disclosed content shall be considered obvious in the art. The basic principles described in the present application may be applied to other variations without departing from the essence and scope of the present application. Therefore, the content disclosed in the present application is not limited to the described embodiments and designs but may also be extended to a maximum scope that is consistent with the principles and disclosed new features of the present application.

What is claimed is:

1. A data transmission method, comprising:
obtaining, by a terminal device, first configuration information that indicates a subframe n for transmitting at least one of a first downlink data channel, a first uplink data channel, a first downlink control channel, a first uplink control channel, a first downlink reference signal, or a first uplink reference signal;
performing, by the terminal device, data transmission with a network device on the subframe n, according to the first configuration information wherein time domain resource locations of a synchronization signal obtained by the terminal device are the same for a frequency division duplex ("FDD") uplink frequency band, an FDD downlink frequency band, and a time division duplex ("TDD") frequency band; and
performing at least one of:
obtaining, by the terminal device, second configuration information, wherein the second configuration information indicates a subframe (n−1) for sequentially transmitting, from front to back in time domain, a second downlink reference signal, a second downlink control channel, and a second downlink data channel, wherein the subframe (n−1) is located on a first carrier, the subframe n is located on a second carrier, and timing on the second carrier lags behind timing on the first carrier, wherein the first configuration information indicates the subframe n for sequentially transmitting, from front to back in time domain, the first uplink reference signal, the first uplink control channel, and first uplink data channel; or
performing a process comprising:
sending, by the terminal device, according to configuration information of the subframe n and as part of the performing the data transmission with the network device, the first uplink reference signal to the network device on the subframe n, for downlink channel measurement;
receiving, by the terminal device, downlink scheduling information that is configured by the network device according to a result of the downlink channel measurement, wherein the downlink scheduling information instructs the terminal device to receive, on a subframe (n+k), downlink data sent by the network device; and
receiving, by the terminal device on the subframe (n+k) according to the downlink scheduling information, the downlink data sent by the network device, wherein k is a positive integer, and wherein both the subframe n and the subframe (n+k) are located on an FDD uplink frequency band or an FDD downlink frequency band.

2. The method according to claim 1, wherein obtaining, by the terminal device, the configuration information comprises: obtaining the configuration information of the subframe n for transmitting the uplink control channel; and
wherein performing, by the terminal device, data transmission with the network device on the subframe n further comprises sending, by the terminal device on the subframe n, hybrid automatic repeat request (HARQ) response information carried on the first uplink control channel to the network device, wherein the HARQ response information indicates a receiving state of downlink data received by the terminal device on a subframe (n−l), and wherein l is a positive integer, and values of l are the same for an FDD uplink frequency band, an FDD downlink frequency band, and a TDD frequency band.

3. The method according to claim 1, wherein obtaining, by the terminal device, the configuration information further comprises obtaining the configuration information of the subframe n for transmitting the uplink data channel; and
wherein performing, by the terminal device, data transmission with the network device on the subframe n comprises: sending, by the terminal device on the subframe n according to uplink scheduling information received on a subframe (n−l), uplink data carried on the first uplink data channel to the network device, wherein l is an integer 0, and values of l are the same for an FDD uplink frequency band, an FDD downlink frequency band, and a TDD frequency band.

4. A data transmission method, comprising:
determining, by a network device, first configuration information of a subframe n for transmitting at least one of a first downlink data channel, a first uplink data channel, a first downlink control channel, a first uplink control channel, a first downlink reference signal, or a first uplink reference signal;
transmitting, by the network device, the first configuration information of the subframe n to a terminal device; and
performing, by the network device, data transmission with the terminal device on the subframe n, according to the first configuration information;
wherein time domain resource locations of a synchronization signal sent by the network device are the same for a frequency division duplex ("FDD") uplink frequency band, an FDD downlink frequency band, and a time division duplex ("TDD") frequency band; and
performing at least one of:
transmitting, by the network device, second configuration information, wherein the second configuration information indicates a subframe (n−1) for sequentially transmitting, from front to back in time domain, a second downlink reference signal, a second downlink control channel, and a second downlink data channel, wherein the subframe (n−1) is located on a first carrier, the subframe n is located on a second carrier, and timing on the second carrier lags behind timing on the first carrier, wherein the first configuration information indicates the subframe n for sequentially transmitting, from front to back in time domain, the first uplink reference signal, the first uplink control channel, and first uplink data channel; or
performing a process comprising:
performing, by the network device, according to configuration information of the subframe n and as part of the performing the data transmission with the terminal device, downlink channel measurement according to the first uplink reference signal;
sending, by the network device, downlink scheduling information to the terminal device according to a result of the downlink channel measurement, wherein the downlink scheduling information instructs that the network device is going to send downlink data to the terminal device on a subframe (n+k); and sending, by the network device, the downlink data to the terminal device on the subframe (n+k);
wherein k is a positive integer, and both the subframe n and the subframe (n+k) are located on an FDD uplink frequency band or an FDD downlink frequency band; or performing a process comprising:
sending, by the network device, according to configuration information of the subframe n, uplink scheduling information on a subframe (n−l), wherein the uplink scheduling information instructs the terminal device to send uplink data on the subframe n for the first uplink data channel, wherein l is an integer ≥0, and values of l are the same for an FDD uplink frequency band, an FDD downlink frequency band, and a TDD frequency band; and
receiving, by the network device on the subframe n, as part of the performing the data transmission with the terminal device, the uplink data that is sent by the terminal device and that is carried on the first uplink data channel.

5. The method according to claim 4, wherein determining, by the network device, the configuration information comprises determining, by the network device, the configuration information of the subframe n for transmitting the uplink control channel;
wherein performing, by the network device, data transmission between a terminal device on the subframe n comprises: receiving, by the network device, on the subframe n, hybrid automatic repeat request (HARQ) response information carried on the first uplink control channel, wherein the HARQ response information indicates a receiving state of downlink data sent by the network device on a subframe (n−m); and
wherein m is a positive integer, and values of m are the same for an FDD uplink frequency band, an FDD downlink frequency band, and a TDD frequency band.

6. A terminal device, comprising:
a processor; and
a non-transitory computer-readable storage medium coupled to the processor and storing programming for execution by the processor;
wherein the programming comprises instructions to:
obtain first configuration information of a subframe n for transmitting at least one of a first downlink data channel, a first uplink data channel, a first downlink control channel, a first uplink control channel, a first downlink reference signal, or a first uplink reference signal;
perform data transmission with a network device on the subframe n according to the first configuration information wherein time domain resource locations of a synchronization signal obtained by the terminal device are the same for a frequency division duplex ("FDD") uplink frequency band, an FDD downlink frequency band, and a time division duplex ("TDD") frequency band; and
perform at least one of:
obtain second configuration information, wherein the second configuration information indicates a subframe (n−1) for sequentially transmitting, from front to back in time domain, a second downlink reference signal, a second downlink control channel, and a second downlink data channel, wherein the subframe (n−1) is located on a first carrier, the subframe n is located on a second carrier, and timing on the second carrier lags behind timing on the first carrier, wherein the first configuration information indicates the subframe n for sequentially transmitting, from front to back in time domain, the first uplink reference signal, the first uplink control channel, and first uplink data channel; or perform a process comprising:
sending according to configuration information of the subframe n and as part of the performing the data transmission with the network device, the first uplink reference signal to the network device on the subframe n, for downlink channel measurement;
receiving downlink scheduling information that is configured by the network device according to a result of the downlink channel measurement, wherein the downlink scheduling information instructs the terminal device to receive, on a subframe (n+k), downlink data sent by the network device; and
receiving, on the subframe (n+k) according to the downlink scheduling information, the downlink data sent by the network device, wherein k is a positive integer, and wherein both the subframe n and the subframe (n+k) are located on an FDD uplink frequency band or an FDD downlink frequency band.

7. The terminal device according to claim 6, wherein the instructions to obtain the configuration information comprise instruction to obtain the configuration information of the subframe n for transmitting the uplink control channel;
wherein the instructions to perform comprise instructions to: send, on the subframe n, hybrid automatic repeat request (HARQ) response information carried on the first uplink control channel to the network device, wherein the HARQ response information is used to indicate a receiving state of downlink data received by the terminal device on a subframe (n−l); and
wherein l is a positive integer, and values of l are the same for an FDD uplink frequency band, an FDD downlink frequency band, and a TDD frequency band.

8. The terminal device according to claim 6, wherein the instructions to obtain the configuration information comprise instructions to obtain the configuration information of the subframe n for transmitting the uplink data channel; and
wherein instructions to perform data transmission comprise instructions to: send, on the subframe n, according to uplink scheduling information received on a subframe (n−l), uplink data carried on the first uplink data channel to the network device, wherein l is an integer ≥0, and values of l are the same for an FDD uplink frequency band, an FDD downlink frequency band, and a TDD frequency band.

9. A network device, comprising:
a processor; and
a non-transitory computer-readable storage medium coupled to the processor and storing programming for execution by the processor, the programming comprising instructions to:
determine first configuration information of a subframe n for transmitting at least one of a first downlink data channel, a first uplink data channel, a first downlink control channel, a first uplink control channel, a first downlink reference signal, or a first uplink reference signal;
transmit the first configuration information of the subframe n to a terminal device; and perform data transmission with the terminal device on the subframe n, according to the first configuration information wherein time domain resource locations of a synchronization signal sent by the network device are the same for a frequency division duplex ("FDD") uplink frequency band, an FDD downlink frequency band, and a time division duplex ("TDD") frequency band; and perform at least one of:
  transmit second configuration information, wherein the second configuration information indicates a subframe (n−1) for sequentially transmitting, from front to back in time domain, a second downlink reference signal, a second downlink control channel, and a second downlink data channel, wherein the subframe (n−1) is located on a first carrier, the subframe n is located on a second carrier, and timing on the second carrier lags behind timing on the first carrier, wherein the first configuration information indicates the subframe n for sequentially transmitting, from front to back in time domain, the first uplink reference signal, the first uplink control channel, and first uplink data channel; or perform a process comprising:
    performing according to first configuration information of the subframe n and as part of the performing the data transmission with the terminal device, downlink channel measurement according to the first uplink reference signal;
    sending downlink scheduling information to the terminal device according to a result of the downlink channel measurement, wherein the downlink scheduling information instructs that the network device is going to send downlink data to the terminal device on a subframe (n+k); and
    sending the downlink data to the terminal device on the subframe (n+k);
    wherein k is a positive integer, and both the subframe n and the subframe (n+k) are located on an FDD uplink frequency band or an FDD downlink frequency band; or perform a process comprising:
    sending, according to configuration information of the subframe n, uplink scheduling information on a subframe (n−1), wherein the uplink scheduling information instructs the terminal device to send uplink data on the subframe n for the first uplink data channel, wherein l is an integer ≥0, and values of l are the same for an FDD uplink frequency band, an FDD downlink frequency band, and a TDD frequency band; and
    receiving, on the subframe n, as part of the performing the data transmission with the terminal device, the uplink data that is sent by the terminal device and that is carried on the first uplink data channel.

10. The network device according to claim 9, wherein instructions to determine the first configuration information comprise instructions to determine the first configuration information of the subframe n for transmitting the uplink control channel; and wherein the instructions to perform comprise instructions to: receive, on the subframe n, hybrid automatic repeat request (HARQ) response information carried on the first uplink control channel, wherein the HARQ response information indicates a receiving state of downlink data sent by the network device on a subframe (n−m), wherein m is a positive integer, and values of m are the same for an FDD uplink frequency band, an FDD downlink frequency band, and a TDD frequency band.

* * * * *